United States Patent
Yang

(10) Patent No.: US 8,063,582 B2
(45) Date of Patent: *Nov. 22, 2011

(54) UNI-DIRECTIONAL LIGHT EMITTING DIODE DRVIE CIRCUIT IN BI-DIRECTIONAL DIVIDED POWER IMPEDANCE

(76) Inventor: Tai-Her Yang, Dzan-Hwa (TW)

( * ) Notice: Subject to any disclaimer, the term of this patent is extended or adjusted under 35 U.S.C. 154(b) by 354 days.

This patent is subject to a terminal disclaimer.

(21) Appl. No.: 12/351,924

(22) Filed: Jan. 12, 2009

(65) Prior Publication Data

US 2009/0179585 A1 Jul. 16, 2009

Related U.S. Application Data

(60) Provisional application No. 61/020,830, filed on Jan. 14, 2008.

(51) Int. Cl.
*H05B 41/36* (2006.01)
(52) U.S. Cl. .......................... 315/291; 315/307; 315/250
(58) Field of Classification Search .................. 315/246, 315/248, 250, 258, 283, 290, 291, 297, 307, 315/227 R, 228, 239, 244, 276
See application file for complete search history.

(56) References Cited

U.S. PATENT DOCUMENTS

| | | | | |
|---|---|---|---|---|
| 5,247,238 A * | 9/1993 | Yang | ............................. | 320/142 |
| 6,628,085 B2 * | 9/2003 | Yang | .......................... | 315/169.3 |
| 7,164,237 B2 * | 1/2007 | Van Casteren | ............ | 315/209 R |
| 7,489,086 B2 * | 2/2009 | Miskin et al. | ............. | 315/185 R |
| 7,518,316 B2 * | 4/2009 | Yu | ............................. | 315/200 R |
| 7,564,198 B2 * | 7/2009 | Yamamoto et al. | ........... | 315/307 |
| 7,847,486 B2 * | 12/2010 | Ng | ................................. | 315/119 |
| 7,868,561 B2 * | 1/2011 | Weightman et al. | .......... | 315/294 |
| 7,902,769 B2 * | 3/2011 | Shteynberg et al. | .......... | 315/291 |
| 2008/0211421 A1 * | 9/2008 | Lee et al. | ..................... | 315/250 |
| 2008/0231204 A1 * | 9/2008 | Praiswater et al. | .......... | 315/192 |
| 2009/0021175 A1 * | 1/2009 | Wendt et al. | ............... | 315/200 R |

* cited by examiner

*Primary Examiner* — Shawki S Ismail
*Assistant Examiner* — Crystal L. Hammond
(74) *Attorney, Agent, or Firm* — Rabin & Berdo, P.C.

(57) ABSTRACT

The present invention transfers AC electric power to mutually series connected resistive impedance components, inductive impedance or capacitive impedance to divide the voltage of the power source, whereby the divided power of each impedance is rectified by the rectifier device to be the uni-directional DV power for driving the unidirectional light emitting diode.

23 Claims, 8 Drawing Sheets

UNI-DIRECTIONAL LIGHT EMITTING DIODE DRVIE CIRCUIT IN BI-DIRECTIONAL DIVIDED POWER IMPEDANCE

BACKGROUND OF THE INVENTION (a) Field of the Invention

The unidirectional light emitting diode drive circuit in bi-directional divided power impedance is disclosed by that an AC power or a periodically alternated polarity power is used as the power source to supply to the resistive impedance components, or inductive impedance components, or capacitive impedance components in mutual series connection, whereby the power source voltage is divided. Thereof, it is characterized in that the said divided power is further rectified by a rectifier device to supply unidirectional DC power output to drive an uni-directional conducting light emitting diode, or to drive at least two rectifier devices which are respectively parallel connected across the two ends of the first impedance and the second impedance while the AC powers of the first impedance and second impedance are respectively converted to DC power output through the said rectifier devices, thereby to drive the unidirectional conducting light emitting diodes individually.

(b) Description of the Prior Art

The conventional light emitting diode drive circuit using AC or DC power source is usually series connected with current limit resistors as the impedance to limit the current to the light emitting diode, whereof the voltage drop of the series connected resistive impedance always result in waste of power and accumulation of heat which are the imperfections.

SUMMARY OF THE INVENTION

The invention is that the first impedance is constituted by capacitive impedance components, inductive impedance components, or resistive impedance components and the second impedance is constituted by capacitive impedance components, inductive impedance components, or resistive impedance components; whereof, the first impedance and the second impedance are in series connection to receive the following:

(1) The AC power with a constant or variable voltage and a constant or variable frequency; or
(2) The AC power of bi-directional sinusoidal wave voltage or bi-directional square wave voltage, or bi-directional pulse wave voltage with constant or variable voltage and constant or variable frequency or period which is converted from a DC power source; or
(3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

The power source voltage input is divided by the first impedance and second impedance in series connection, whereof the divided power is supplied to a rectifier device which provides the DC power output through its DC output ends to drive the uni-directional conducting light emitting diode set which is constituted by light emitting diodes to emit light.

DESCRIPTION OF MAIN COMPONENT SYMBOLS

Figure 1:
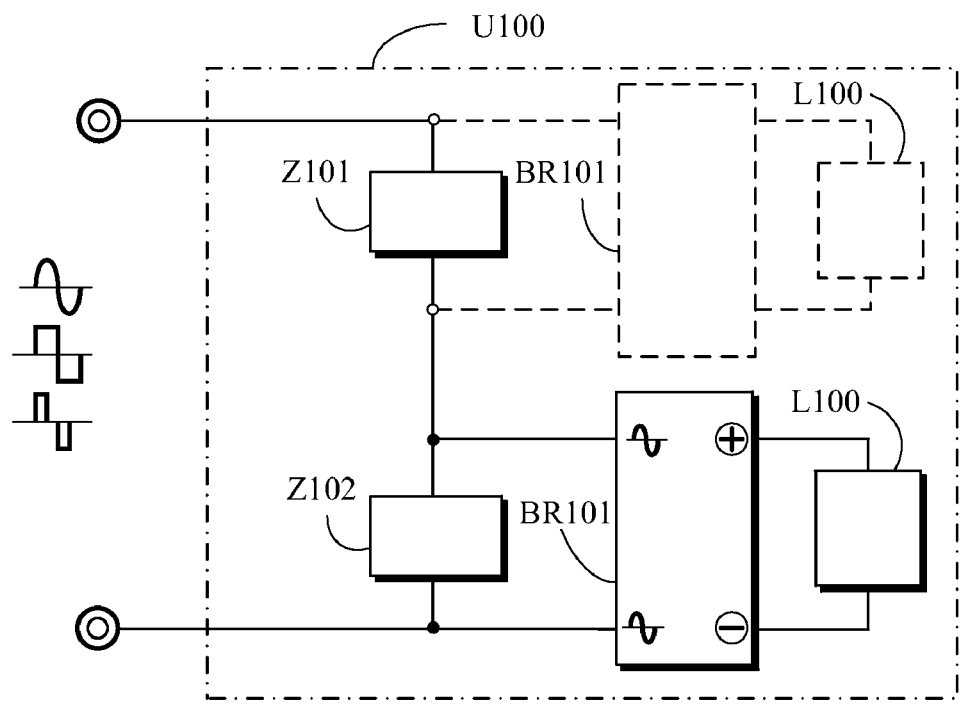
FIG. 1 is the schematic block diagram of the unidirectional light emitting diode drive circuit in bi-directional divided power impedance.

BR101: Rectifier device
C100, C102, C200: Capacitor
CR201: Diode
ESD101: Charge/discharge device
I103, I200: Inductive impedance component
IT200: Separating type transformer
L100: Uni-directional conducting light emitting diode set
LED101: Light emitting diode
R101, R102: Discharge resistor
R103: Current limit resistor
ST200: Self-coupled transformer
U100: Uni-directional light emitting diode (LED) drive circuit
W0: Self-coupled voltage change winding
W1: Primary side winding
W2: Secondary side winding
Z101: First impedance
Z102: Second impedance
ZD101: Zener diode
300: Bi-directional power modulator of series connection type
360: DC power modulator of series connection type
400: Bi-directional power modulator of parallel connection type
460: DC power modulator of parallel connection type
500: Impedance component
600: Switching device
4000: DC to AC Inverter

DETAILED DESCRIPTION OF THE PREFERRED EMBODIMENTS

The uni-directional light emitting diode drive circuit in bi-directional divided power impedance is disclosed by that the first impedance is constituted by at least one capacitive impedance component, inductive impedance component, or resistive component and the second impedance is constituted by at least one capacitive impedance component, inductive impedance component, or resistive impedance component. Thereof the first impedance and the second impedance are in series connection, whereof at least one rectifier device is installed, and the input ends of the said rectifier device is provided to receive the divided power across the two ends of the first impedance or the second impedance and the DC power output from the said rectifier device is used to drive at least one uni-directional conducting light emitting diode;

The two ends of the first impedance and the second impedance in series connection are provided to receive:
 (1) The AC power with a constant or variable voltage and a constant or variable frequency; or
 (2) The AC power of bi-directional sinusoidal wave voltage or bi-directional square wave voltage, or bi-directional pulse wave voltage with constant or variable voltage and constant or variable frequency or period which is converted from a DC power source; or
 (3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

The bi-directional divided power of the first impedance or the second impedance is rectified by the rectifier device to drive at least one uni-directional conducting light emitting diode or is driven by at least two rectifier devices which are respectively parallel connected across the two ends of the first and second impedances for the rectifier devices to respectively receive the AC power of the first and second impedances and rectify as DC power output to drive the individual unidirectional conducting light emitting diodes.

FIG. 1 is the schematic block diagram of the uni-directional light emitting diode drive circuit in bi-directional divided power impedance, in which the circuit function is operated through the uni-directional light emitting diode drive circuit (U100) as shown in FIG. 1, whereof it is comprised of that:

A first impedance (Z101) is comprised of that:
 (1) A first impedance (Z101) is comprised of capacitive impedance components, or inductive impedance components or resistive impedance components, whereof it can be optionally installed as needed one kind or more than one kind and one or more than one impedance components, or can be optionally installed as needed by two or more than two kinds of impedance components, whereof each kind of impedance components can be respectively to be one or more than one in series connection, or parallel connection or series and parallel connection; or
 (2) The first impedance (Z101) is constituted by at least one capacitive impedance component and at least one inductive impedance component in mutually series connection, whereof their inherent series resonance frequency is the same as the frequency of bi-directional power from power source such as the AC power, or the alternated polarity period of the constant or variable periodically alternated polarity power converted from a DC power, thereby to appear in a series resonance impedance status; or
 (3) The first impedance (Z101) is constituted by at least one capacitive impedance component and at least one inductive impedance component in mutual parallel connection, whereof their inherent parallel resonance frequency after parallel connection is the same as frequency of the bi-directional power from power source such as the AC power, or the alternated polarity period of the constant or variable periodically alternated polarity power converted from a DC power, thereby to appear a parallel resonance impedance status;

A second impedance (Z102) is comprised of that:
 (1) A second impedance (Z102) is comprised of capacitive impedance components, or inductive impedance components or resistive impedance components, whereof it can be optionally installed as needed one kind or more than one kind and one or more than one impedance components, or can be optionally installed as needed by two or more than two kinds of impedance components, whereof each kind of impedance components can be respectively to be one or more than one in series connection, or parallel connection or series and parallel connection; or
 (2) The second impedance (Z102) is constituted by at least one capacitive impedance component and at least one inductive impedance component in mutually series connection, whereof their inherent series resonance frequency is the same as the frequency of bi-directional power from power source such as the AC power, or the alternated polarity period of the constant or variable periodically alternated polarity power converted from a DC power, thereby to appear in a series resonance impedance status; or
 (3) The second impedance (Z102) is constituted by at least one capacitive impedance component and at least one inductive impedance component in mutual parallel connection, whereof their inherent parallel resonance frequency after parallel connection is the same as frequency of the bi-directional power from power source such as the AC power, or the alternated polarity period of the constant or variable periodically alternated polarity power converted from a DC power, thereby to appear a parallel resonance impedance status;

At least one first impedance (Z101) and at least one second impedance (Z102) are mutually series connected, whereof the two ends of the first impedance (Z101) and the second impedance (Z102) in series connection are provided for:
  (1) The AC power with a constant or variable voltage and a constant or variable frequency; or
  (2) The AC power of bi-directional sinusoidal wave voltage or bi-directional square wave voltage, or bi-directional pulse wave voltage with constant or variable voltage and constant or variable frequency or period which is converted from a DC power source; or
  (3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

The divided power is formed at the two ends of the first impedance (Z101) and the two ends of the second impedance (Z102) trough power input, whereof the divided power is provided to the AC input ends of the rectifier device (BR101);

A rectifier device (BR101): It is parallel connected across the two ends of the first impedance (Z101) or the second impedance (Z102), or respectively parallel connected across two ends of the first impedance (Z101) and the second impedance (Z102) simultaneously, thereby the divided power across the two ends of the first impedance (Z101) or the second impedance (Z102) is rectified to a DC power which is used to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode, or two or more than two forward current polarity light emitting diodes in series connection or parallel connection, or three or more than three forward current polarity light emitting diodes in series connection, parallel connection or series and parallel connection;

The uni-directional conducting light emitting diode set (L100) can be selected as needed to be installed one set or more than one sets to be driven by DC power output from the rectifier device (BR101);

One or more than one first impedance (Z101), second impedance (Z102), uni-directional conducting light emitting diode set (L100) and rectifier device (BR101) in the unidirectional light emitting diode drive circuit (U100) can be optionally installed as needed.

The divided power produced by the first impedance or the second impedance is rectified by a rectifier device to DC power and is used to drive at least one uni-directional conducting light emitting diode, or the AC powers of the first impedance and the second impedance are respectively rectified by two rectifier devices which are respectively parallel connected across the two ends of the first impedance and the second impedance to DC powers and are used to drive the individual uni-directional conducting light emitting diodes.

For convenience of description, the components listed in the circuit examples of the following exemplary embodiments are selected as in the following:
  (1) A first impedance (Z101), a second impedance (Z102), a rectifier device (BR101) and an uni-directional conducting light emitting diode set (L100) are installed in the embodied examples. Nonetheless, the selected quantities are not limited in actual applications;
  (2) A capacitive impedance of the capacitor is selected to represent the impedance component, whereby to constitute the first impedance (Z101) and the second impedance (Z102) in the embodied examples. In actual applications, the impedance components can be optionally selected as needed to be constituted by various capacitive impedance components, inductive impedance components or resistive impedance components, wherein it is described in the following.

Figure 2:
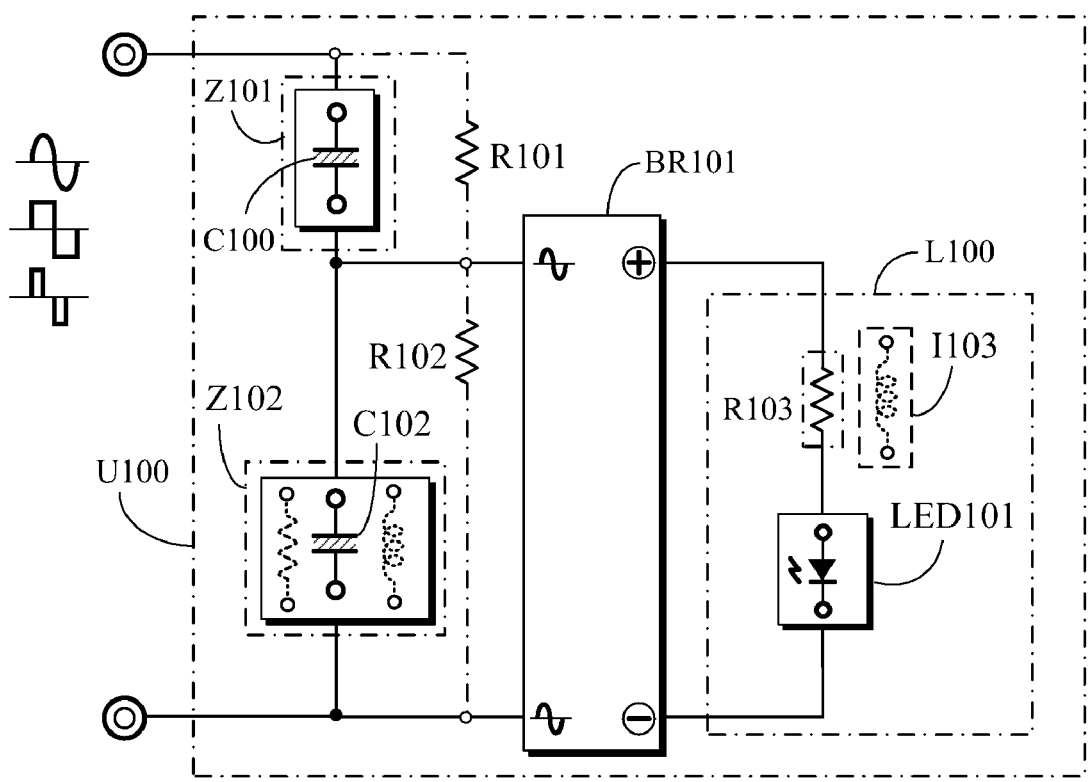
FIG. 2 is the circuit example schematic diagram of the invention.

FIG. 2 is the circuit example schematic diagram of the invention which is mainly constituted by the following:

A first impedance (Z101): it is constituted by at least one capacitive impedance component, especially by the capacitor (C100), whereof the number of the first impedance can be one or more than one;

A second impedance (Z102): it is constituted by at least one capacitive impedance component, especially by the capacitor (C102), whereof the number of the second impedance can be one or more than one;

At least one first impedance (Z101) and at least one second impedance (Z102) are in series connection, whereof the two ends of them after series connection are provided for receiving:
  (1) The AC power with a constant or variable voltage and a constant or variable frequency; or
  (2) The AC power of bi-directional sinusoidal wave voltage or bi-directional square wave voltage, or bi-directional pulse wave voltage with constant or variable voltage and constant or variable frequency or period which is converted from a DC power source; or
  (3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

A rectifier device (BR101): at least one rectifier device (BR101) is installed to receive the divided power from the two ends of the first impedance (Z101) or the second impedance (Z102), or two or more than two rectifier devices (BR101) are respectively installed to receive the divided power from the two ends of the first impedance (Z101) or the second impedance (Z102) thereby the divided power across the two ends of the first impedance (Z101) or the second impedance (Z102) is rectified to DC power to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode (LED101), or two or more than two forward current polarity light emitting diodes (LED101) in series connection or parallel connection, or three or more than three forward current polarity light emitting diodes (LED101) in series connection, parallel connection or series and parallel connection; one or more than one set of the uni-directional conducting light emitting diode set (L100) can be optionally installed as needed to be driven by the DC power output from the rectifier device (BR101);

The AC input ends of the rectifier device (BR101) are provided to receive the divided power across the two ends of the capacitor (C102) which constitute the second impedance (Z102), whereby the uni-directional conducting light emitting diode set (L100) is driven by the DC power rectified by the said rectifier unit (BR101), and the first impedance (Z101) is used to limit its current, whereof in case that the capacitor (C100) is used as the first impedance component, its output current is limited by the capacitive impedance;

A discharge resistor (R101): It is an optionally installed component as needed to be parallel connected across the two ends of the capacitor (C100) which constitutes the first impedance (Z101) to release the residual charge of capacitor (C100);

A discharge resistor (R102): It is an optionally installed component as needed to be parallel connected across the two ends of the capacitor (C102) which constitutes the second impedance (Z102) to release the residual charge of capacitor (C102);

A current limit resistor (R103): It is an optionally installed component as needed to be individually series connected with each of light emitting diodes (LED101) which constitute the uni-directional conducting light emitting diode set (L100), whereby to limit the current passing through the light emitting diode (LED101); whereof the current limit resistor (R103) can also be replaced by an inductive impedance component (I103).

The uni-directional light emitting diode drive circuit (U100) is constituted by the first impedance (Z101), the second impedance (Z102), the rectifier device (BR101) and the uni-directional conducting light emitting diode set (L100) according to above said circuit structure;

In addition, the uni-directional conducting light emitting diode set (L100) in the uni-directional light emitting diode drive circuit (U100) of the uni-directional light emitting diode drive circuit in bi-directional divided power impedance is through the divided power distribution effect by the parallel connection between the rectifier device (BR101) and the second impedance (Z102) to reduce the voltage variation rate across the two ends of uni-directional conducting light emitting diode set (L100) corresponding to the power source of voltage variation.

Figure 3:
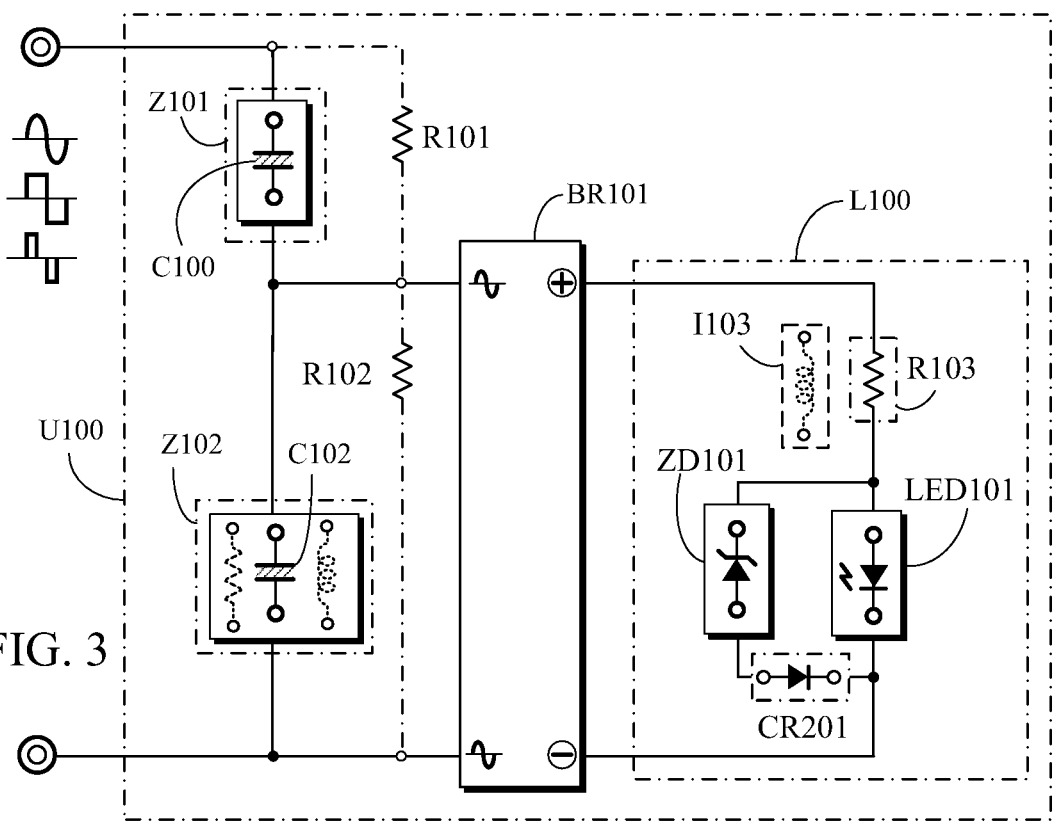
FIG. 3 is a circuit example schematic diagram illustrating that the unidirectional conducting light emitting diode set in the circuit of FIG. 2 is further installed with a zener diode.

The light emitting diode (LED101) which constitutes the uni-directional conducting light emitting diode set (L100) in the uni-directional light emitting diode drive circuit (U100) of the uni-directional light emitting diode drive circuit in bi-directional divided power impedance includes the following selections:

The uni-directional conducting light emitting diode set (L100) is constituted by a forward current polarity light emitting diode (LED101), or two or more than two forward current polarity light emitting diodes (LED101) in series connection or parallel connection, or three or more than three forward current polarity light emitting diodes (LED101) in series connection, parallel connection or series and parallel connection, whereof one or more than one set of the unidirectional conducting light emitting diode set (L100) can be optionally installed as needed;

In addition, to protect the light emitting diode and to avoid the light emitting diode (LED101) being damaged or reduced working life by abnormal voltage, a zener diode can be further parallel connected across the two ends of the light emitting diode (LED101) of the uni-directional conducting light emitting diode set (L100) in the uni-directional light emitting diode drive circuit (U100) of the uni-directional light emitting diode drive circuit in bi-directional divided power impedance, or the zener diode can be first series connected with at least one diode to produce zener voltage function, then parallel connected across the two ends of the light emitting diode (LED101);

FIG. 3 is a circuit example schematic diagram illustrating that the uni-directional conducting light emitting diode set in the circuit of FIG. 2 is further installed with a zener diode, whereof it is constituted by the following:

A zener diode (ZD101) is parallel connected across the two ends of the light emitting diode (LED101) of the unidirectional conducting light emitting diode set (L100) in the uni-directional light emitting diode drive circuit (U100), whereof their polarity relationship is that the zener voltage of the zener diode (ZD101) is used to limit the working voltage across the two ends of the light emitting diode (LED101);

A zener diode (ZD101) is parallel connected across the two ends of the light emitting diode (LED101) of the unidirectional conducting light emitting diode set (L100) in the uni-directional light emitting diode drive circuit (U100), whereof the said zener diode (ZD101) can be optionally series connected with a diode (CR201) as needed to produce the zener voltage effect together, whereby the advantages are 1) the zener diode (ZD101) can be protected from abnormal reverse voltage; 2) both diode (CR201) and zener diode (ZD101) have temperature compensation effect.

Figure 4:
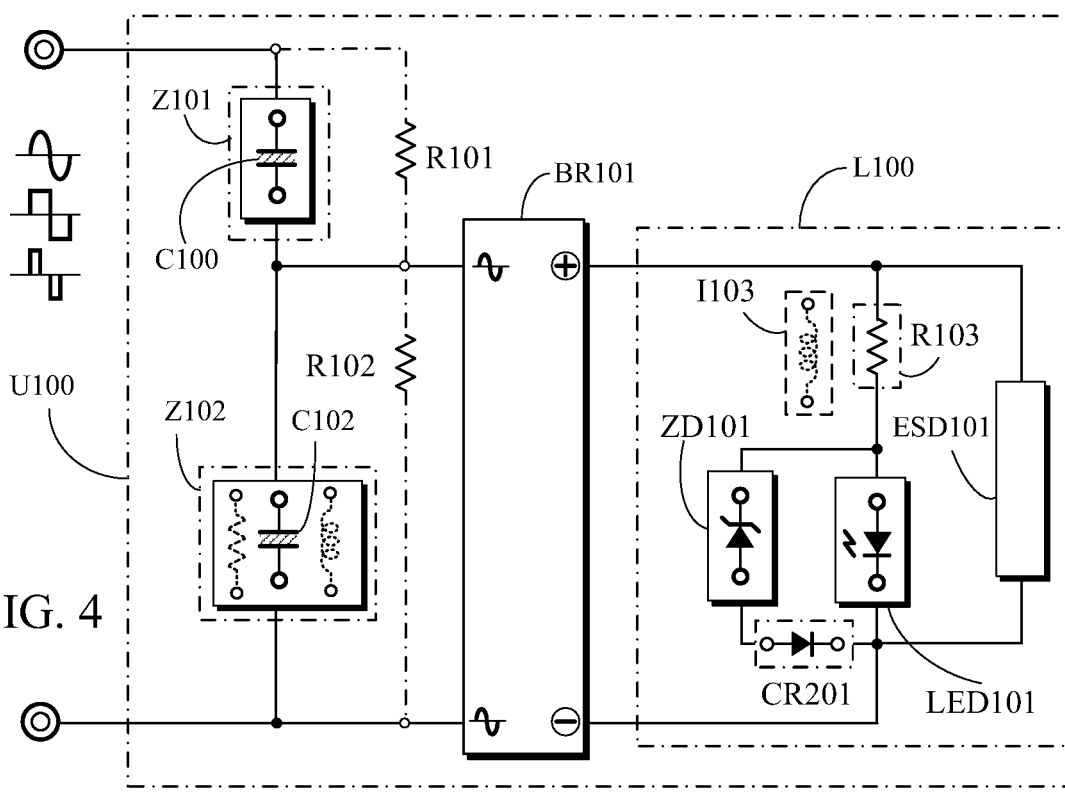
FIG. 4 is a circuit example schematic diagram illustrating that a charge/discharge device is parallel connected across the two ends of the light emitting diode and the current limit resistor in series connection in the circuit of FIG. 3.

To promote the lighting stability of the light source produced by the light emitting diode in the unidirectional light emitting diode drive circuit (U100) of the unidirectional light emitting diode drive circuit in bi-directional divided power impedance, the light emitting diode (LED101) can be further installed with a charge/discharge device (ESD101), whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

As shown in FIG. 4, which is a circuit example schematic diagram illustrating that a charge/discharge device is parallel connected across the two ends of the light emitting diode and the current limit resistor in series connection in the circuit of FIG. 3.

Figure 5:
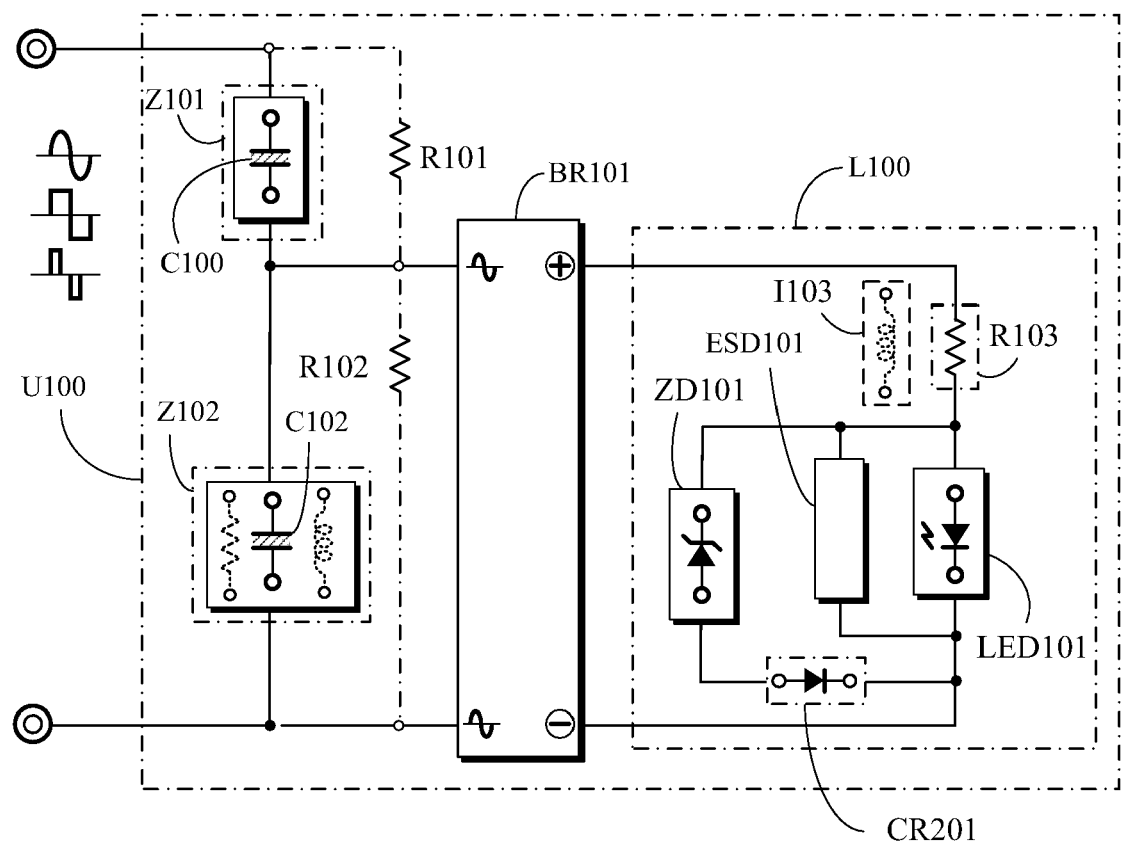
FIG. 5 is a circuit example schematic diagram illustrating that a charge/discharge device is parallel connected with the light emitting diode in the circuit of FIG. 3.

As shown in FIG. 5, which is a circuit example schematic diagram illustrating that a charge/discharge device is parallel connected across the two ends of the light emitting diode in the circuit of FIG. 3.

FIG. 4 and FIG. 5 are comprised of that:

The unidirectional conducting light emitting diode set (L100) can be further installed with a charge/discharge device (ESD101) including to be parallel connected across the two ends of the light emitting diode (LED101) and the current limit resistor (R103) in series connection as shown in FIG. 4, or across the two ends of the light emitting diode (LED101) as shown in FIG. 5 according to polarities, whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously.

The aforesaid charge/discharge device (ESD101) can be constituted by the conventional charging and discharging batteries, or super-capacitors or capacitors, etc.

Figure 6:
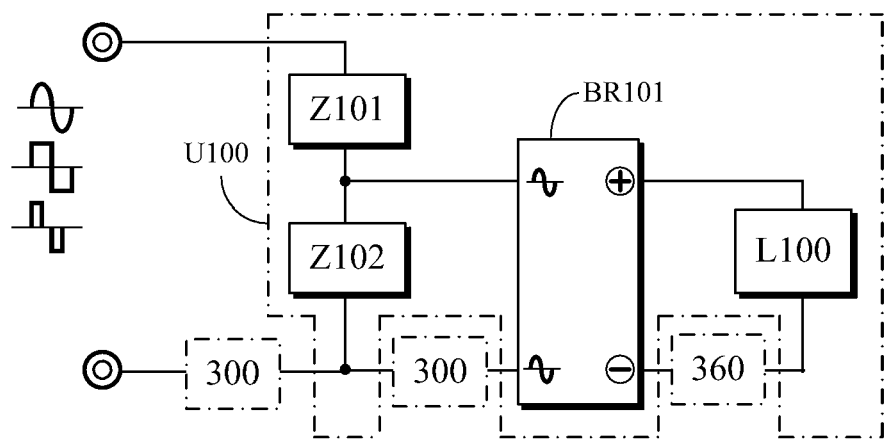
FIG. 6 is a circuit example schematic block diagram of the invention which is series connected to the power modulator of series connection type.

The first impedance (Z101), second impedance (Z102), rectifier device (BR101) and uni-directional conducting light emitting diode set (L100) as well as the light emitting diode (LED101) and various aforesaid optional auxiliary circuit components as shown in the circuit examples of FIGS. 1~5 are based on application needs, whereof they can be optionally installed or not installed as needed and the installation quantity include constitution by one, wherein if more than one are selected in the application, the corresponding polarity relationship shall be determined based on circuit function requirement to execute series connection, or parallel connection or series and parallel connections; thereof it is constituted as the following:

1. The first impedance (Z101) can be constituted by one or by more than one in series connection or parallel connection or series and parallel connection, whereof in multiple installations, each first impedance can be constituted by the same kind of capacitive impedance components, inductive impedance components, or resistive impedance components, or other different kinds of impedance components, in which their impedance values can be the same or different;

2. The second impedance (Z102) can be constituted by one or by more than one in series connection or parallel connection or series and parallel connection, whereof in multiple installation, each second impedance can be constituted by the same kind of capacitive impedance components, inductive impedance components, or resistive impedance components, or other different kinds of impedance components, in which their impedance values can be the same or different;

3. The light emitting diode (LED101) can be constituted by one light emitting diode, or by more than one light emitting diodes in series connection, parallel connection or series and parallel connection;

4. In the uni-directional light emitting diode drive circuit (U100):

(1) The uni-directional conducting light emitting diode set (L100) can be optionally selected to be installed by one set or can be selected to be installed by more than one sets in series connection, parallel connection or series and parallel connection, whereof if one or more than one sets are installed, it can be jointly driven by the divided power of the same second impedance (Z102) through its matched rectifier device (BR101), or it can be individually driven by the divided power of multiple second impedances (Z102) in series or parallel connection, whereof each of the multiple second impedances (Z102) is installed with a rectifier device (BR101) individually to drive its corresponding matched uni-directional conducting light emitting diode set (L100) individually;

(2) If a charge/discharge device (ESD101) is installed in the uni-directional light emitting diode drive circuit (U100), then the light emitting diode (LED101) of the uni-directional conducting light emitting diode set (L100) is driven by DC power to emit light continuously;

If the charge/discharge device (ESD101) is not installed, then current conduction to light emitting diode (LED101) is intermittent, whereby referring to the input voltage wave shape and duty cycle of current conduction, the light emitting forward current and the peak of light emitting forward voltage of each light emitting diode in the uni-directional conducting light emitting diode set (L100) can be correspondingly selected for the light emitting diode (LED101), whereof the selections include the following:

1) The light emitting peak of forward voltage is lower than the rated forward voltage of light emitting diode (LED101); or 2) The rated forward voltage of light emitting diode (LED101) is selected to be the light emitting peak of forward voltage; or 3) If current conduction to light emitting diode (LED101) is intermittent, the peak of light emitting forward voltage can be correspondingly selected based on the duty cycle of current conduction as long as the principle of that the peak of light emitting forward voltage does not damage the light emitting diode (LED101) is followed;

Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101);

The luminosity or the stepped or step-less luminosity modulation of the forward current vs. relative luminosity can be controlled based on the aforesaid value and wave shape of forward current;

5. The discharge resistor (R101) can be optionally installed as needed to be constituted by one resistor, or by more than one resistors in series connection or parallel connection or series and parallel connection;

6. The discharge resistor (R102) can be optionally installed as needed to be constituted by one resistor, or by more than one resistors in series connection or parallel connection or series and parallel connection;

7. The current limit resistor (R103) can be optionally installed as needed to be constituted by one resistor, or by more than one resistors in series connection or parallel connection or series and parallel connection;

8. The inductive impedance component (I103) can be constituted by one impedance component, or by more than one impedance components in series connection or parallel connection or series and parallel connection, whereof the said devices can be optionally installed as needed;

9. The zener diode (ZD101) can be constituted by one zener diode, or by more than one zener diodes in series connection or parallel connection or series and parallel connection, whereof the said devices can be optionally installed as needed;

10. The diode (CR201) can be constituted by one diode, or by more than one diodes in series connection or parallel connection or series and parallel connection, whereof the said devices can be optionally installed as needed;

11. The charge/discharge device (ESD101) can be constituted by one or by more than one in series connection or parallel connection or series and parallel connection, whereof the said devices can be optionally installed as needed;

In the application of the unidirectional light emitting diode drive circuit (U100) of the uni-directional light emitting diode drive circuit in bi-directional divided power impedance, the following different types of bi-directional power can be provided for inputs, whereof the bi-directional power includes that:

(1) The AC power with a constant or variable voltage and a constant or variable frequency; or (2) The AC power of bi-directional sinusoidal wave voltage or bi-directional square wave voltage, or bi-directional pulse wave voltage with constant or variable voltage and constant or variable frequency or period which is converted from a DC power source; or (3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

In addition, the following active modulating circuit devices can be further optionally combined as needed, whereof the applied circuits are the following:

1. FIG. 6 is a circuit example schematic block diagram of the invention which is series connected to the power modulator of series connection type, whereof the power modulator of series connection type is constituted by the following:

A bi-directional power modulator of series connection type (300): It is constituted by the conventional electromechanical components or solid state power components and related electronic circuit components to modulate the bi-directional power output.

A DC power modulator of series connection type (360): It is constituted by the conventional electromechanical components or solid state power components and related electronic circuit components to modulate the DC power for voltage stabilization, or DC pulsed power output.

Figure 7:
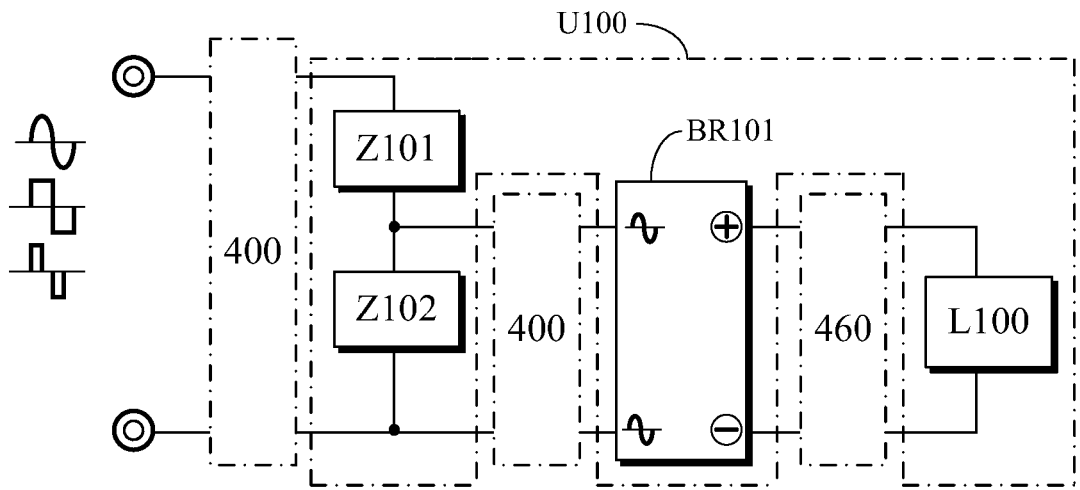
FIG. 7 is a circuit example schematic block diagram of the invention which is parallel connected to the power modulator of parallel connection type.
Figure 8:
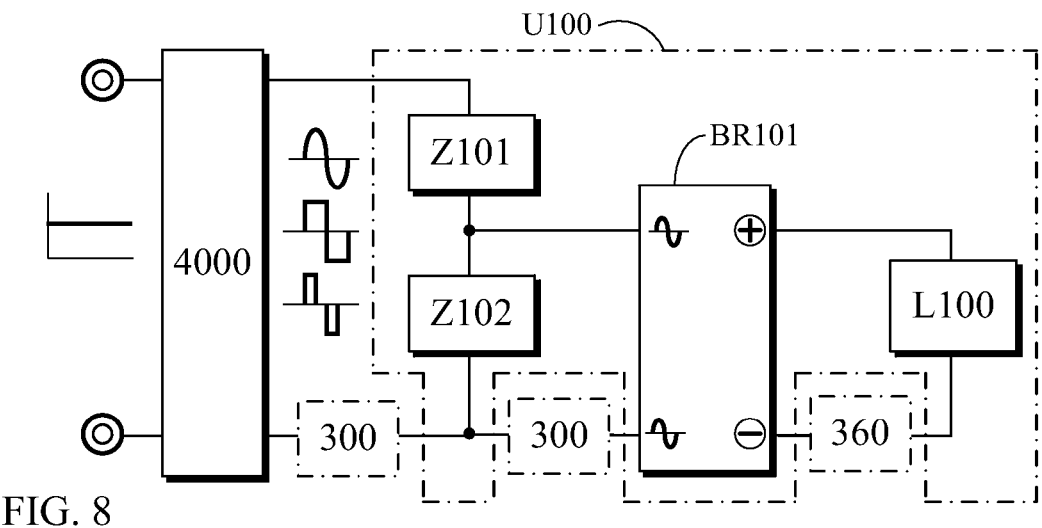
FIG. 8 is a circuit example schematic block diagram illustrating that the invention is series connected with a periodically alternated power modulator of series connection type which is driven by the output power of the DC to AC inverter.

The circuit operating functions are the following:

(1) The bi-directional power modulator of series connection type (300) can be optionally installed as needed to be series connected with the uni-directional light emitting diode drive circuit (U100) to receive the bi-directional power from power source, whereby the bi-directional power is modulated by the bi-directional power modulator of series connection type (300) to execute power modulations such as pulse width modulation or current conduction phase angle control, or impedance modulation, etc. to drive the uni-directional light emitting diode drive circuit (U100); or (2) The bi-directional power modulator of series connection type (300) can be optionally installed as needed to be series connected between the second impedance (Z102) and the AC input ends of the rectifier device (BR101) whereby the bi-directional divided power from the two ends of the second impedance (Z102) is modulated by the bi-directional power modulator of series connection type (300) to execute power modulations such as pulse width modulation or current conduction phase angle control, or impedance modulation, etc. to drive the uni-directional conducting light emitting diode set (L100) through the rectifier device (BR101); or (3) The DC power modulator of series connection type (360) can be optionally installed as needed to be series connected between the DC output ends of the rectifier device (BR101) and the uni-directional conducting light emitting diode set (L100), whereby DC power from the rectifier device (BR101) is modulated by the DC power modulator of series connection type (360) to execute power modulations such as pulse width modulation or current conduction phase angle control, or impedance modulation, etc. to drive the uni-directional conducting light emitting diode set (L100);

2. FIG. 7 is a circuit example schematic block diagram of the invention which is parallel connected to a power modulator of parallel connection type, whereof the power modulator of parallel connection type is constituted by the following:

A bi-directional power modulator of parallel connection type (400): It is constituted by the conventional electromechanical components or solid state power components and related electronic circuit components to modulate the bi-directional power output;

A DC power modulator of parallel connection type (460): It is constituted by the conventional electromechanical components or solid state power components and related electronic circuit components to modulate the DC power for voltage stabilization, or DC pulsed power output;

The circuit operating functions are the following:

(1) The bi-directional power modulator of parallel connection type (400) can be optionally installed as needed, whereof its output ends are for parallel connection with the uni-directional light emitting diode drive circuit (U100), while its input ends are provided for receiving the bi-directional power from the power source, whereby the bi-directional power is modulated by the bi-directional power modulator of parallel connection (400) to execute power modulations such as pulse width modulation or current conduction phase angle control, or impedance modulation, etc. to drive the uni-directional light emitting diode drive circuit (U100); or (2) The bi-directional power modulator of parallel connection type (400) can be optionally installed as needed, whereof its output ends are parallel connected with the bi-directional power input ends of the rectifier device (BR101) while its input ends are parallel connected across the two ends of the second impedance (Z102), whereby the bi-directional divided power across the two ends of the second impedance (Z102) is modulated by the bi-directional power modulator of parallel connection type (400) to execute power modulations such as pulse width modulation or current conduction phase angle control, or impedance modulation, etc. to drive the unidirectional conducting light emitting diode set (L100) by the DC power which is rectified by the rectifier device (BR101); or (3) The DC power modulator of parallel connection type (460) can be optionally installed as needed, whereof its output ends are parallel connected with the unidirectional conducting light emitting diode set (L100), while its input ends are parallel connected with the DC output ends of the rectifier device (BR101), whereby the DC power of the rectifier device (BR101) is modulated by the DC power modulator of parallel connection type (460) to execute power modulations such as pulse width modulation or current conduction phase angle control, or impedance modulation, etc. to drive the unidirectional conducting light emitting diode set (L100);

3. FIG. 8 is a circuit example schematic block diagram illustrating that the invention is series connected with a power modulator of series connection type which is driven by the output power of the DC to AC inverter, whereof the constitutions of the DC to AC inverter and the power modulator of series connection type include the following:

A DC to AC Inverter (4000): it is constituted by the conventional electromechanical components or solid state power components and related electronic circuit components, whereof its input ends are optionally provided as needed to receive input from a constant or variable voltage DC power, or a DC power rectified from an AC power, while its output ends are optionally selected as needed to supply a bi-directional power of bi-directional sinusoidal wave, or bi-directional square wave or bi-directional pulsed wave AC power in a constant or variable voltage and constant or variable alternated polarity frequency or periods;

A bi-directional power modulator of series connection type (300): It is constituted by the conventional electromechanical components or solid state power components and related electronic circuit components to modulate the bi-directional power output.

A DC power modulator of series connection type (360): It is constituted by the conventional electromechanical components or solid state power components and related electronic circuit components to modulate the DC power for voltage stabilization, or DC pulsed power output.

Figure 9:
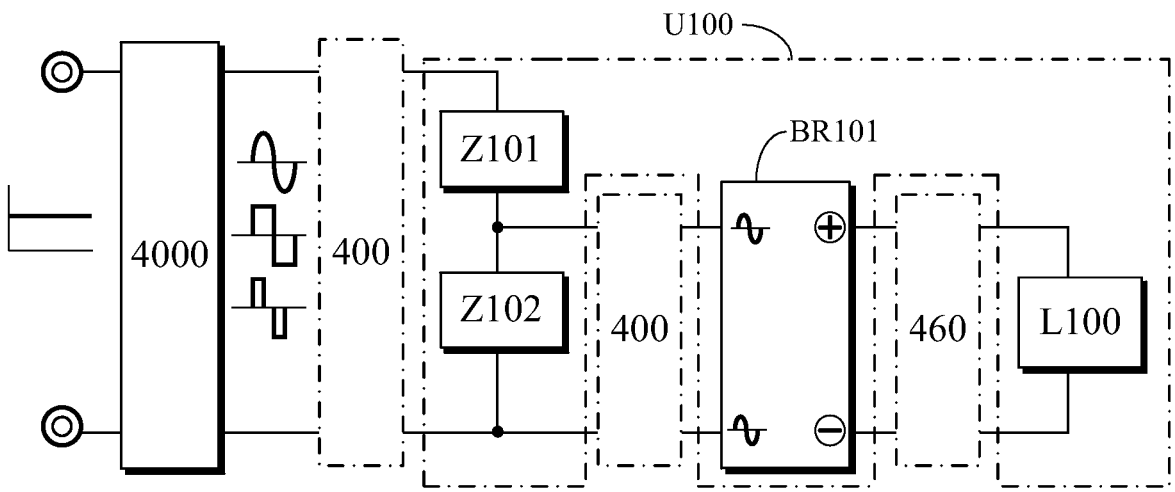
FIG. 9 is a circuit example schematic block diagram illustrating that the invention is parallel connected with a periodically alternated power modulator of parallel connection type which is driven by the output power of the DC to AC inverter.

The circuit operating functions are described in the following:

(1) A bi-directional power modulator of series connection type (300) can be optionally installed as needed to series connected with the uni-directional light emitting diode drive circuit (U100). After the two are in series connection, they are parallel connected with the output ends of the DC to AC inverter (4000), and the output ends of the DC to AC inverter can be optionally selected as needed to provide a bi-directional power of a bi-directional sinusoidal wave square wave or pulse wave power output at a constant or variable voltage and constant or variable alternated polarity frequency or periods, and the bi-directional power output of the DC to AC inverter (4000) is modulated by the bi-directional power modulator of series connection type (300) to execute power modulations such as pulse width modulation or current conduction phase angle control, or impedance modulation, etc. to drive the uni-directional light emitting diode drive circuit (U100); or (2) The bi-directional power modulator of series connection type (300) can be optionally installed as needed to be series connected between the second impedance (Z102) and the AC input ends of the rectifier device (BR101) whereby the bi-directional divided power across the two ends of the second impedance (Z102) is modulated by the bi-directional power modulator of series connection type (300) to execute power modulations such as pulse width modulation or current conduction phase angle control, or impedance modulation, etc. to drive the uni-directional conducting light emitting diode set (L100) through the rectifier device (BR101); or (3) The DC power modulator of series connection type (360) can be optionally installed as needed to be series connected between the DC output ends of the rectifier device (BR101) and the uni-directional conducting light emitting diode set (L100), whereby DC power from the rectifier device (BR101) is modulated by the DC power modulator of series connection type (360) to execute power modulations such as pulse width modulation or current conduction phase angle control, or impedance modulation, etc. to drive the unidirectional conducting light emitting diode set (L100);

4. FIG. 9 is a circuit example schematic block diagram illustrating that the invention is parallel connected with a power modulator of parallel connection type which is driven by the output power of the DC to AC inverter, whereof the constitutions of the DC to AC inverter and the power modulator of parallel connection type include the following:

A DC to AC Inverter (4000): it is constituted by the conventional electromechanical components or solid state power components and related electronic circuit components, whereof its input ends are optionally provided as needed to receive input from a constant or variable voltage DC power, or a DC power rectified from an AC power, while its output ends are optionally selected as needed to supply a bi-directional power of bi-directional sinusoidal wave, or bi-directional square wave or bi-directional pulsed wave AC power in a constant or variable voltage and constant or variable alternated polarity frequency or periods;

A bi-directional power modulator of parallel connection type (400): It is constituted by the conventional electromechanical components or solid state power components and related electronic circuit components to modulate the bi-directional power output;

A DC power modulator of parallel connection type (460): It is constituted by the conventional electromechanical components or solid state power components and related electronic circuit components to modulate the DC power for voltage stabilization, or DC pulsed power output.

Figure 10:
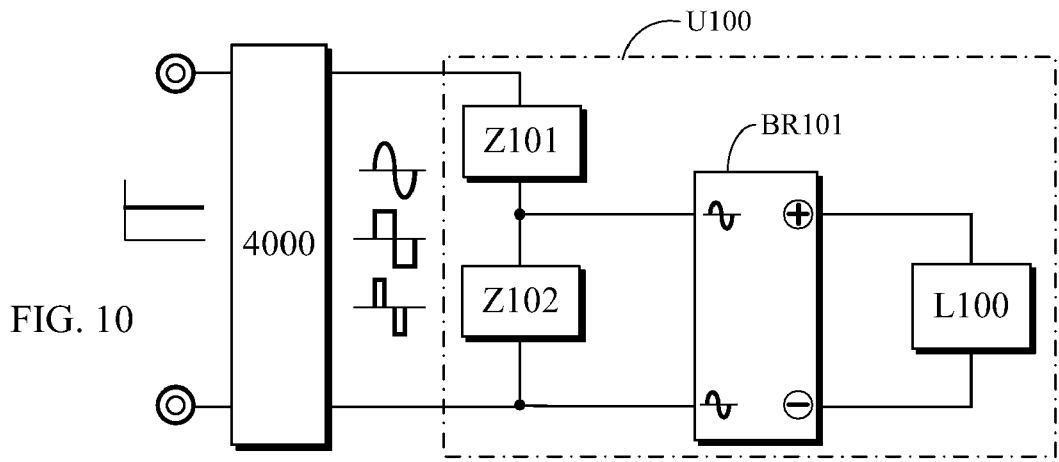
FIG. 10 is a circuit example schematic block diagram of the invention driven by the DC to AC converter output power.

The circuit operating functions are described in the following:

(1) A bi-directional power modulator of parallel connection type (400) can be optionally installed as needed, whereof its output ends are parallel connected with the input ends of the uni-directional light emitting diode drive circuit (U100) and its input ends are provided to receive the bi-directional power output from the DC to AC inverter (4000), whereby the bi-directional power output of the DC to AC invert (4000) is modulated by the bi-directional power modulator of parallel connection type (400) to execute power modulations such as pulse width modulation or current conduction phase angle control, or impedance modulation, etc. to drive the uni-directional light emitting diode drive circuit (U100); or (2) The bi-directional power modulator of parallel connection type (400) can be optionally installed as needed, whereof its output ends are parallel connected with the AC input ends of the rectifier device (BR101) while its input ends are parallel connected with the second impedance (Z102), whereby the bi-directional divided power across the two ends of the second impedance (Z102) is modulated by the bi-directional power modulator of parallel connection type (400) to execute power modulations such as pulse width modulation or current conduction phase angle control, or impedance modulation, etc. to drive the uni-directional conducting light emitting diode set (L100) through the rectifier device (BR101); or (3) The DC power modulator of parallel connection type (460) can be optionally installed as needed, whereof its output ends are parallel connected with the uni-directional conducting light emitting diode set (L100), while its input ends are parallel connected with the DC output ends of the rectifier device (BR101), whereby the DC power of the rectifier device (BR101) is modulated by the DC power modulator of parallel connection type (460) to execute power modulations such as pulse width modulation or current conduction phase angle control, or impedance modulation, etc. to drive the uni-directional conducting light emitting diode set (L100);

5. FIG. 10 is a circuit example schematic block diagram of the invention driven by a DC to AC converter output power; it is mainly comprised of that:

A DC to AC Inverter (4000): it is constituted by the conventional electromechanical components or solid state power components and related electronic circuit components, whereof its input ends are optionally provided as needed to receive input from a constant or variable voltage DC power, or a DC power rectified from an AC power, while its output ends are optionally selected as needed to supply a bi-directional power of bi-directional sinusoidal wave, or bi-directional square wave or bi-directional pulsed wave AC power in a constant or variable voltage and constant or variable alternated polarity frequency or periods;

The circuit operating functions are the following:

The uni-directional light emitting diode drive circuit (U100) is parallel connected across the output ends of the conventional DC to AC inverter (4000); the input ends of the DC to AC inverter (4000) are optionally provided as needed to receive input from a constant or variable voltage DC power, or a DC power rectified from an AC power.

The output ends of the DC to AC inverter (4000) can be optionally selected as needed to provide a bi-directional power of bi-directional sinusoidal wave, or bi-directional square wave, or bi-directional pulse wave power in a constant or variable voltage and constant or variable alternated periods, which is used to control and drive the uni-directional light emitting diode drive circuit (U100).

In addition, the uni-directional light emitting diode drive circuit (U100) can be controlled and driven by means of modulating the output power from the DC to AC inverter (4000), as well as by executing power modulations to the power outputted such as pulse width modulation, or conductive current phase angle control, or impedance modulation, etc.;

6. The uni-directional light emitting diode drive circuit (U100) is arranged to be series connected with a least one conventional impedance component (500) and further to be parallel connected with the power source, whereof the impedance (500) includes that:

(1) An impedance component (500): it is constituted by a component with capacitive impedance characteristics; or (2) An impedance component (500): it is constituted by a component with inductive impedance characteristics; or (3) An impedance component (500): it is constituted by a component with resistive impedance characteristics; or (4) An impedance component (500): it is constituted by a single impedance component with the combined impedance characteristics of at least two of the resistive impedance, or inductive impedance, or capacitive impedance simultaneously, thereby to provide DC or AC impedances; or (5) An impedance component (500): it is constituted by a single impedance component with the combined impedance characteristics of capacitive impedance and inductive impedance, whereof its inherent resonance frequency is the same as the frequency or period of bi-directional power, thereby to produce a parallel resonance status; or (6) An impedance component (500): it is constituted by one kind or more than one kind of one or more than ones capacitive impedance component, or inductive impedance component, or resistive impedance component or two kinds or more than two kinds of impedance components in series connection, or parallel connection, or series and parallel connection so as to provide DC or AC impedances; or (7) An impedance component (500): it is constituted by the mutual series connection of a capacitive impedance component and an inductive impedance component, whereof its inherent series resonance frequency is the same as the frequency or period of bi-directional power, thereby to produce a series resonance status and the end voltage across two ends of the capacitive impedance component or the inductive impedance component appear in series resonance correspondingly;

Or the capacitive impedance and the inductive impedance are in mutual parallel connection, whereby its inherent parallel resonance frequency is the same as the frequency or period of bi-directional power, thereby to produce a parallel resonance status and appear the corresponding end voltage.

Figure 11:
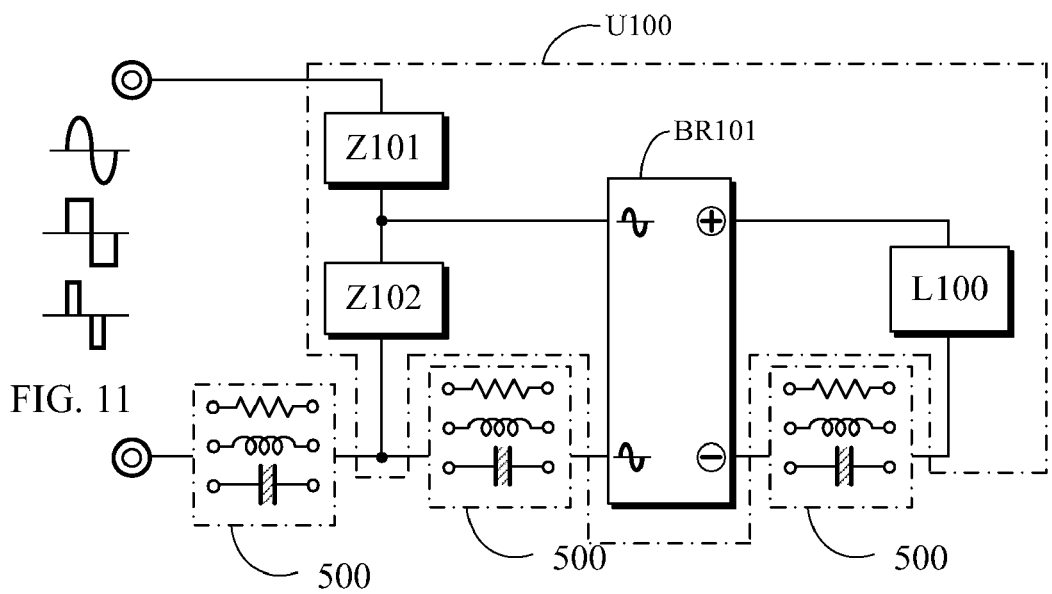
FIG. 11 is a circuit example schematic block diagram of the invention which is series connected with impedance components.
Figure 12:
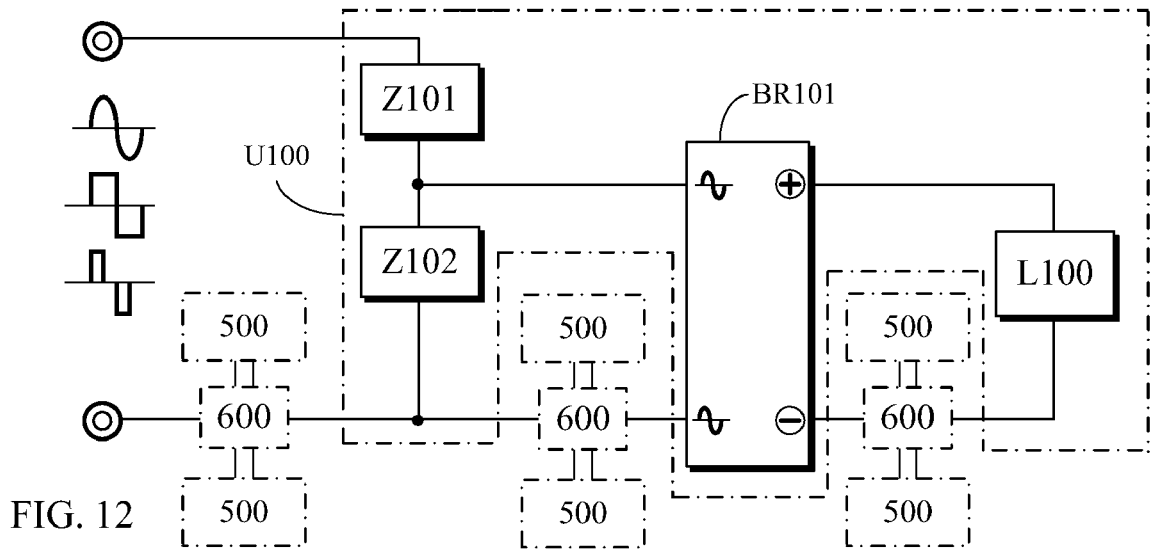
FIG. 12 is a circuit example schematic block diagram of the invention illustrating that the impedance components in series connection execute series connection, or parallel connection, or series and parallel connection by means of the switching device.

FIG. 11 is a circuit example schematic block diagram of the invention which is series connected with impedance components;

7. At least two impedance components (500) as said in the item 6 execute switches between series connection, parallel connection and series and parallel connection bye means of the switching device (600) which is constituted by electromechanical components or solid state components, whereby to modulate the power transmitted to the uni-directional light emitting diode drive circuit (U100), wherein FIG. 12 is a circuit example schematic block diagram of the invention illustrating that the impedance components in series connection execute series connection, or parallel connection, or series and parallel connection by means of the switching device.

Figure 13:
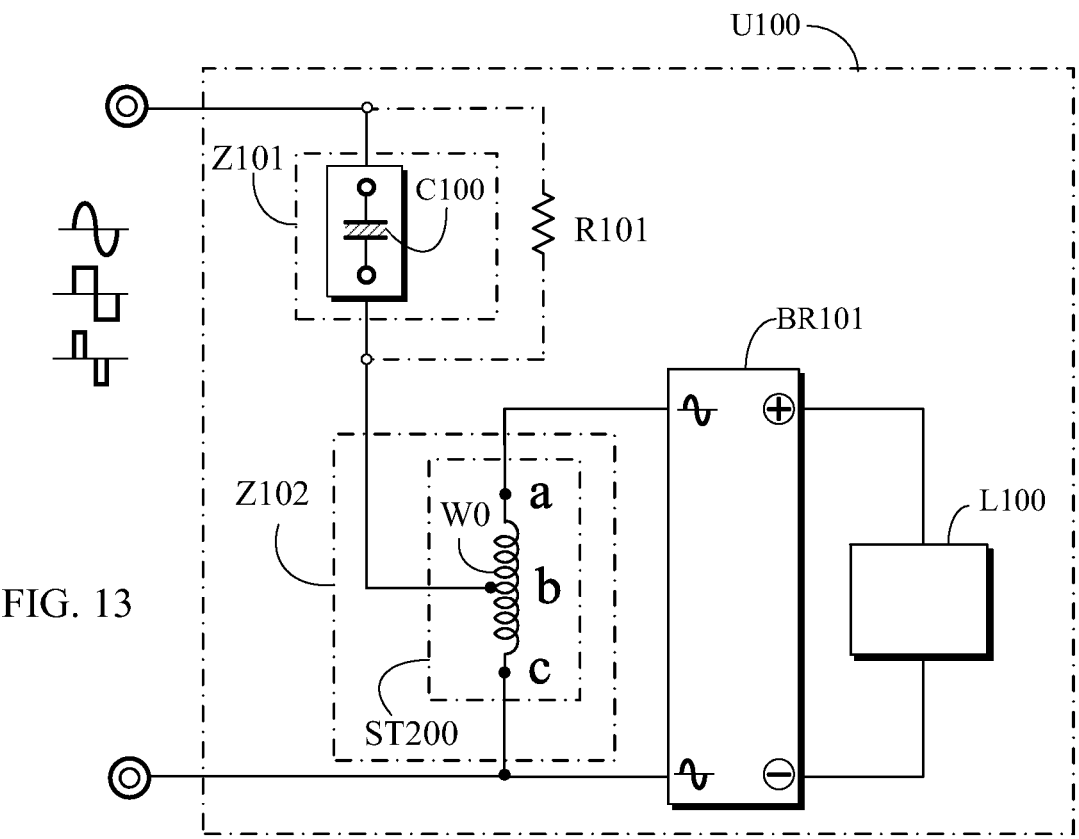
FIG. 13 is a circuit example schematic diagram of the invention illustrating that the inductive impedance component of the second impedance is replaced by the self-coupled voltage change power supply side winding of the self-coupled transformer thereby to constitute a voltage rise.

The uni-directional light emitting diode drive circuit in bi-directional divided power impedance, in which the optionally installed inductive impedance component (I200) of the second impedance (Z102) can be further replaced by the power supply side winding of a transformer with inductive effect, whereof the transformer can be a self-coupled transformer (ST200) with self-coupled voltage change winding or a transformer (IT200) with separating type voltage change winding;

FIG. 13 is a circuit example schematic diagram of the invention illustrating that the inductive impedance component of the second impedance is replaced by the self-coupled voltage change power supply side winding of the self-coupled transformer thereby to constitute a voltage rise; whereof as shown in FIG. 13, the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102), thereby to constitute the second impedance (Z102), whereof its inherent series resonance frequency with the capacitor (C100) of the first impedance (Z101) in series connection is the same as the frequency of the bi-directional power from power source such as the AC power, or the alternated polarity period of the constant or variable voltage and constant or variable periodically alternated polarity power converted from a DC power to appear in series resonance status, whereof the a, c output ends of the self-coupled voltage change winding (W0) of the self-coupled transformer (ST200) are arranged to provide the AC power of voltage rise to the AC input ends of the rectifier device (BR101), while the output ends of the rectifier device (BR101) are used to drive the uni-directional conducting light emitting diode set (L100).

Figure 14:
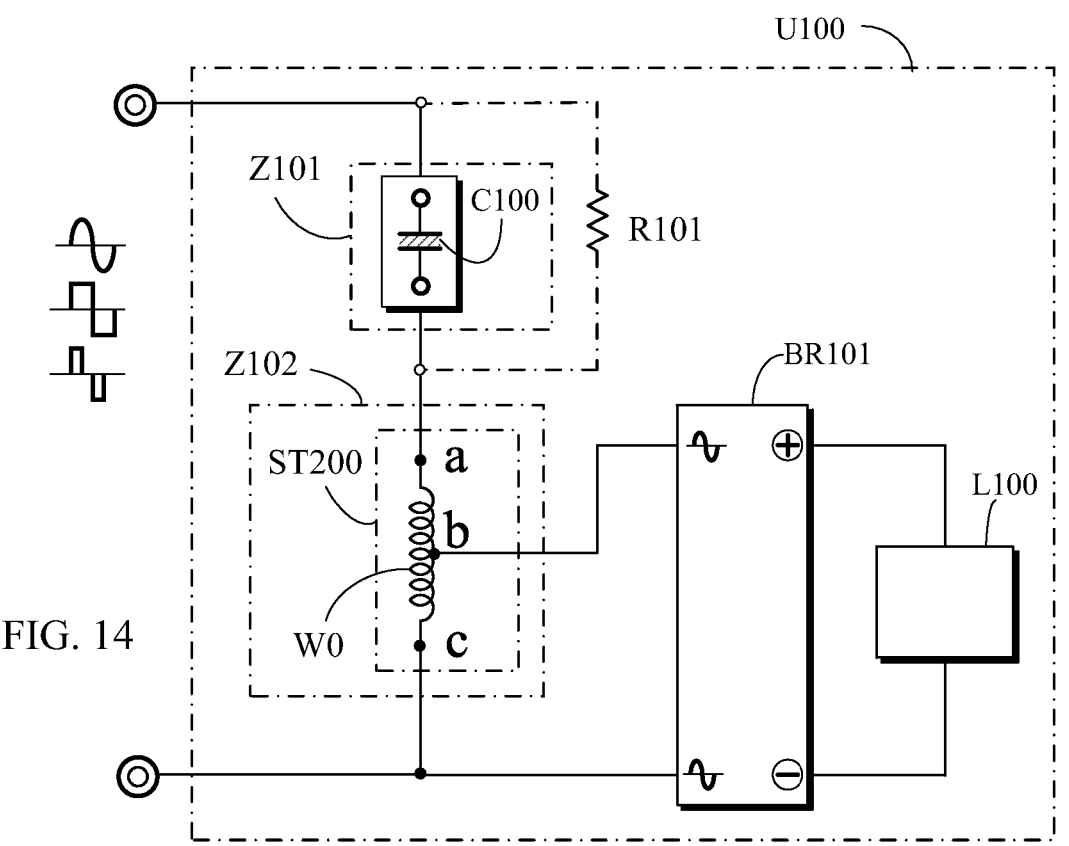
FIG. 14 is a circuit example schematic diagram of the invention illustrating that the inductive impedance component of the second impedance is replaced by the self-coupled voltage change power supply side winding of the self-coupled transformer thereby to constitute a voltage drop.

FIG. 14 is a circuit example schematic diagram of the invention illustrating that the inductive impedance component of the second impedance is replaced by the self-coupled voltage change power supply side winding of the self-coupled transformer thereby to constitute a voltage drop, whereof as shown in FIG. 14, the self-coupled transformer (ST200) has a self-coupled voltage change winding (W0) with voltage drop function, the a, c ends of the self-coupled voltage change winding (W0) of the self-coupled transformer (ST200) are the power supply side which replace the inductive impedance component (I200) of the second impedance (Z102), thereby to constitute the second impedance (Z102), whereof its inherent series resonance frequency with the capacitor (C100) of the first impedance (Z101) in series connection is the same as the frequency of the bi-directional power from power source such as AC power, or the alternated polarity period of the constant or variable voltage and constant or variable periodically alternated polarity power converted from a DC power to appear in series resonance status, whereof the b, c output ends of the self-coupled voltage change winding (W0) of the self-coupled transformer (ST200) are arranged to provide the AC power of voltage drop to the AC input ends of the rectifier device (BR101), while the output ends of the rectifier device (BR101) are used to drive the uni-directional conducting light emitting diode set (L100).

Figure 15:
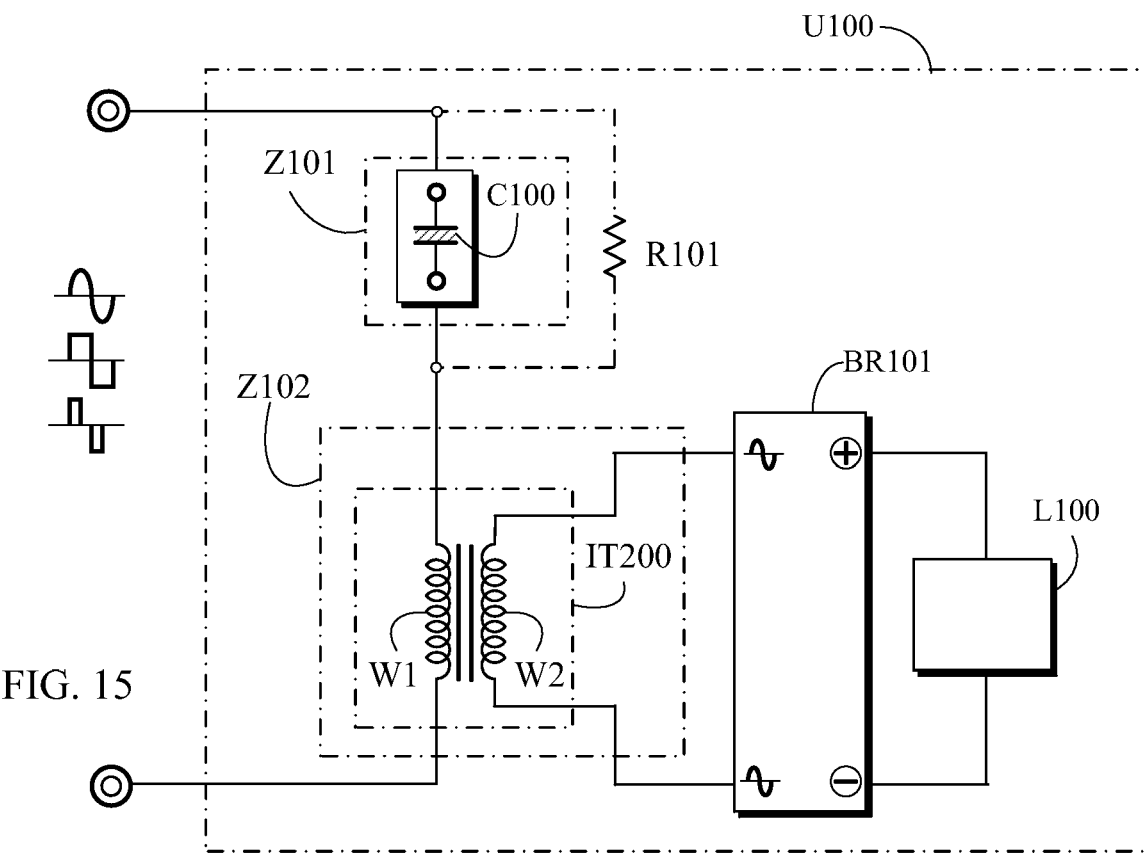
FIG. 15 is a circuit example schematic diagram of the invention illustrating that the inductive impedance component of the second impedance is replaced by the primary side winding of the separating type transformer with separating type voltage change winding.

FIG. 15 is a circuit example schematic diagram of the invention illustrating that the inductive impedance component of the second impedance is replaced by the primary side winding of the separating type transformer with separating type voltage change winding, whereof as shown in FIG. 15, the separating type transformer (IT200) is comprised of a primary side winding (W1) and a secondary side winding (W2), in which the primary side winding (W1) and the secondary side winding (W2) are separated. The primary side winding (W1) constitute the second impedance (Z102), whereof its inherent series resonance frequency with the capacitor (C100) of the first impedance (Z101) in series connection is the same as frequency of the bi-directional power from power source such as the AC power, or the alternated polarity period of the constant or variable voltage and constant or variable periodically alternated polarity power converted to appear in series resonance status, whereof the output voltage of the secondary side winding (W2) of the separating type transformer (IT200) can be optionally selected to provide AC power of voltage rise or voltage drop is arranged to provided to the AC input ends of the rectifier device (BR101), while the DC output ends of the rectifier device (BR101) are used to drive the unidirectional conducting light emitting diode set (L100).

Through the above description, the inductive impedance component (I200) of the second impedance (Z102) is replaced by the power supply side winding of the transformer, whereof the secondary side of the separating type transformer (IT200) provides AC power of voltage rise or voltage drop to the AC input ends of the rectifier device (BR101) while the DC output ends of the rectifier device (BR101) are used to drive the uni-directional conducting light emitting diode set (L100).

The unidirectional light emitting diode drive circuit in bi-directional divided power impedance, in which the optionally installed inductive impedance component (I200) of the second impedance (Z102) can be further replaced by the power supply side winding of a transformer with inductive effect, thereby to constitute the second impedance (Z102) which is parallel connected with the capacitor (C200) to appear parallel resonance, whereof the transformer can be a self-coupled transformer (ST200) with self-coupled voltage change winding or a transformer (IT200) with separating type voltage change winding.

Figure 16:
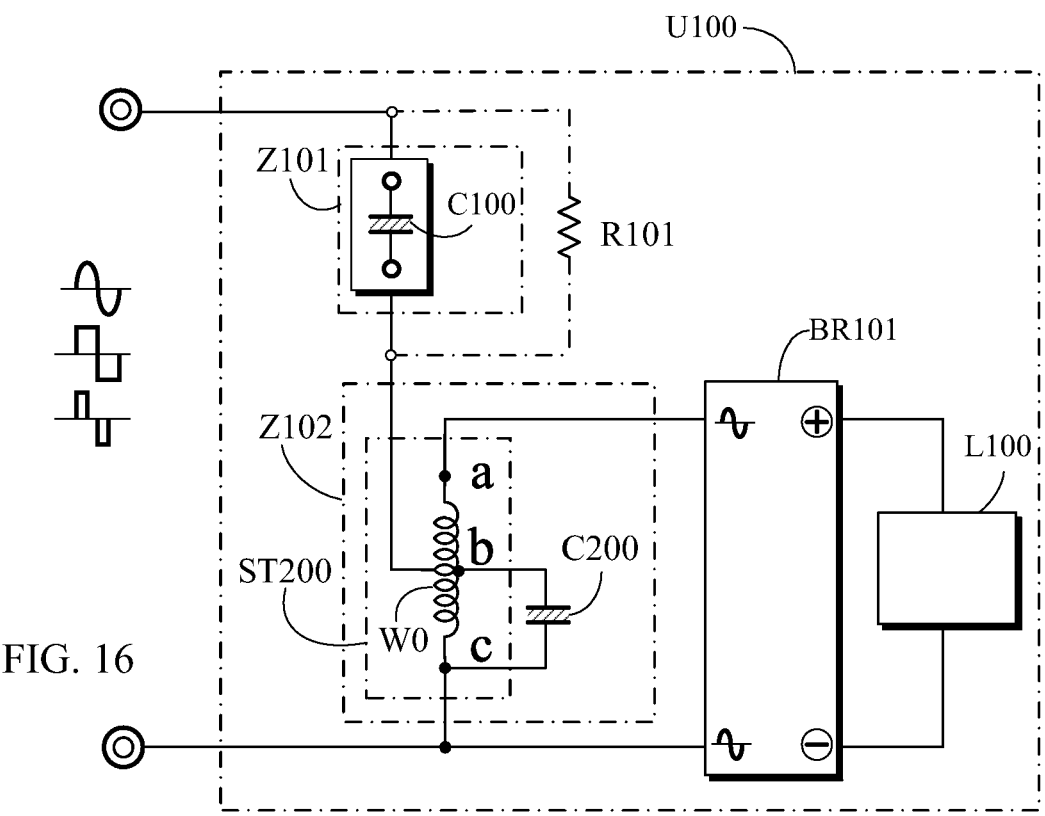
FIG. 16 is a circuit example schematic diagram of the invention illustrating that the self-coupled voltage change power supply side winding of the self-coupled transformer is in parallel resonance with the parallel connected capacitive impedance component to constitute a voltage rise.

FIG. 16 is a circuit example schematic diagram of the invention illustrating that the self-coupled voltage change power supply side winding of the self-coupled transformer is in parallel resonance with the parallel connected capacitor to constitute a voltage rise, whereof as shown in FIG. 16, the self-coupled transformer (ST200) has a self-coupled voltage change winding (W0) with voltage raising function, the b, c ends of the self-coupled voltage change winding (W0) of the self-coupled transformer (ST200) is the power supply side which replace the inductive impedance component (I200) of the second impedance (Z102) to be parallel connected with the capacitor (C200), whereof its inherent parallel resonance frequency after parallel connection is the same as frequency of the bi-directional power from power source such as the AC power, or the alternated polarity period of the constant or variable voltage and constant or variable periodically alternated polarity power converted from DC power to produce a parallel resonance status, thereby to constitute the second impedance (Z102), which is series connected with the capacitor (C100) of the first impedance (Z101); further, the capacitor (C200) can be optionally parallel connected with the a, c taps or b, c taps of the self-coupled transformer (ST200), or other selected taps as needed, whereof the a, c output ends of the self-coupled voltage change winding (W0) of the self-coupled transformer (ST200) are arranged to provide AC power of voltage rise to the AC input ends of the rectifier device (BR101), while the DC output ends of the said rectifier device (BR101) are used to provide power to drive the uni-directional conducting light emitting diode set (L100).

Figure 17:
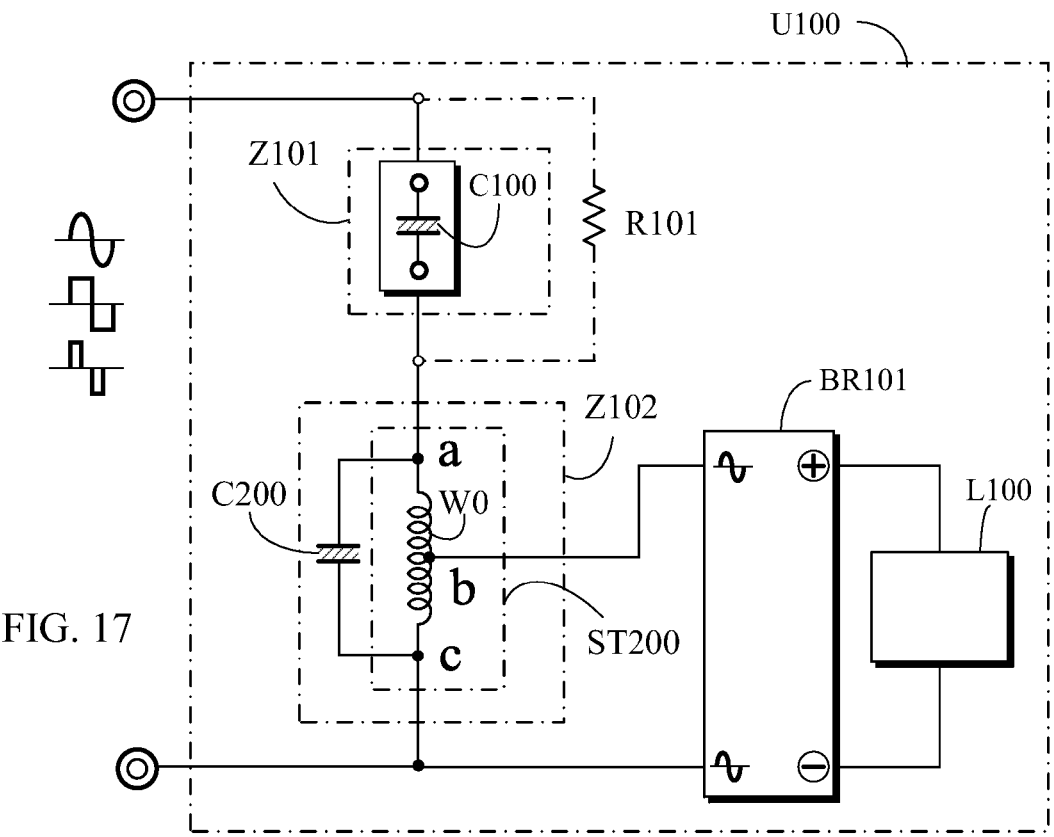
FIG. 17 is a circuit example schematic diagram of the invention illustrating that the self-coupled voltage change power supply side winding of the self-coupled transformer is in parallel resonance with the parallel connected capacitive impedance component to constitute a voltage drop.

FIG. 17 is a circuit example schematic diagram of the invention illustrating that the self-coupled voltage change power supply side winding of the self-coupled transformer is in parallel resonance with the parallel connected capacitor to constitute a voltage drop, whereof as shown in FIG. 17, the self-coupled transformer (ST200) has a self-coupled voltage change winding (W0) with voltage drop function, in which the a, c ends of the self-coupled voltage change winding (W0) of the self-coupled transformer (ST200) are the power supply side which replace the inductive impedance component (I200) of the second impedance (Z102) to be parallel connected with the capacitor (C200), whereof its inherent parallel resonance frequency after parallel connection is the same as frequency of the bi-directional power from power source such as the AC power, the alternated polarity period of the constant or variable voltage and constant or variable periodically alternated polarity power converted from DC power so as to produce a parallel resonance status, thereby to constitute the second impedance (Z102), which is series connected with the capacitor (C100) of the first impedance (Z101), further, the capacitor (C200) can be optionally parallel connected with the a, c taps or b, c taps of the self-coupled transformer (ST200), or other selected taps as needed, whereof the b, c output ends of the self-coupled voltage change winding (W0) of the self-coupled transformer (ST200) are arranged to provide AC power of voltage drop to the AC input ends of the rectifier device (BR101), while the DC output ends of the said rectifier device (BR101) are used to provide power to drive the uni-directional conducting light emitting diode set (L100).

Figure 18:
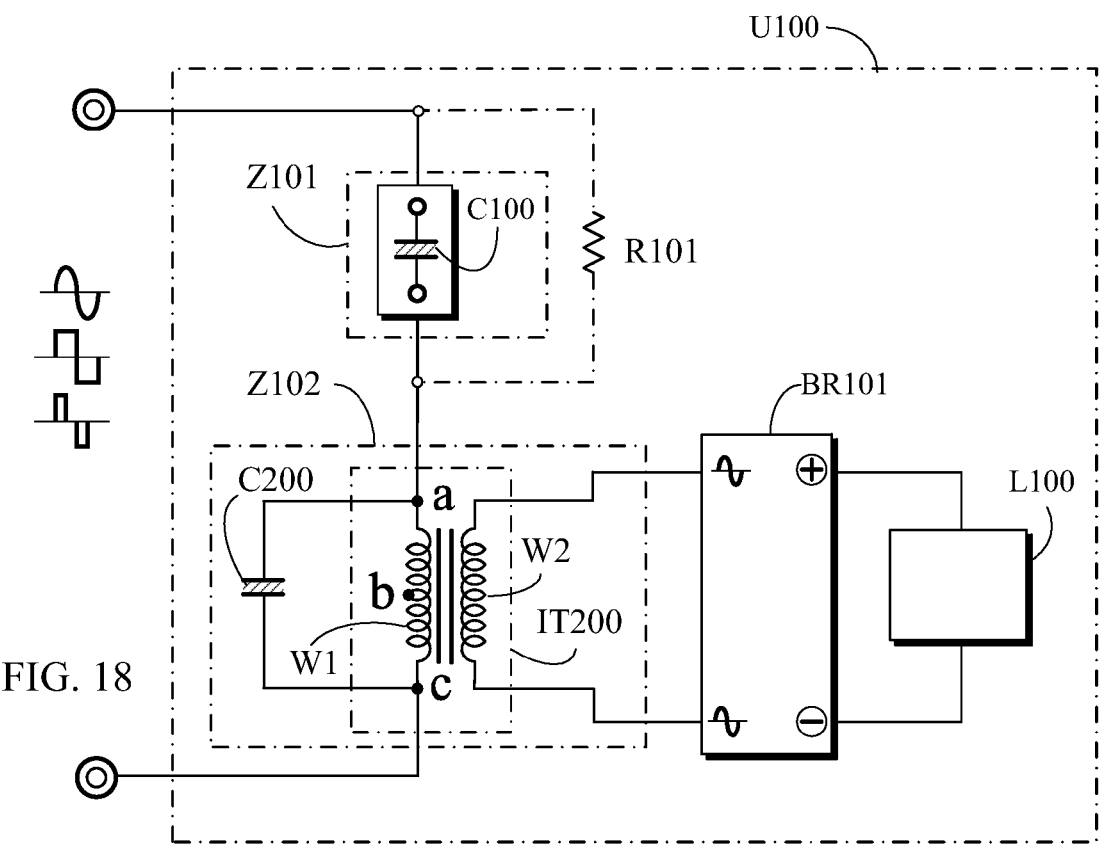
FIG. 18 is a circuit example schematic diagram of the invention illustrating that the primary side winding of the separating type transformer with separating type voltage change winding is parallel connected with a capacitive impedance component to appear a parallel resonance status.

FIG. 18 is a circuit example schematic diagram of the invention illustrating that the primary side winding of the separating type transformer with separating type voltage change winding is parallel connected with a capacitor to appear a parallel resonance status; whereof as shown in FIG. 18, the separating type transformer (IT200) is comprised of a primary side winding (W1) and a secondary side winding (W2), in which the primary side winding (W1) and the secondary side winding (W2) are separated; the primary side winding (W1) is parallel connected with the capacitor (C200), whereof its inherent parallel resonance frequency after parallel connection is the same as frequency of the bi-directional power from power source such as the AC power, or the alternated polarity period of the constant or variable voltage and constant or variable periodically alternated polarity power converted from DC power so as to produce a parallel resonance status, thereby to constitute the second impedance (Z102), which is series connected with the capacitor (C100) of the first impedance (Z101); further, the capacitor (C200) can be optionally parallel connected with the a, c taps or b, c taps of the self-coupled transformer (ST200), or other selected taps as needed, the output voltage of the secondary side winding (W2) of the separating type transformer (IT200) can be optionally selected as needed to be voltage rise or voltage drop, and the AC power output from the secondary side winding is arranged to provided to the AC input ends of the rectifier device (BR101), while the DC output ends of the said rectifier device (BR101) is used to provide power to drive the unidirectional conducting light emitting diode set (L100).

Through the above description, the inductive impedance component (I200) of the second impedance (Z102) is replaced by the power supply side winding of the transformer and is parallel connected with the capacitor (C200) to appear parallel resonance, thereby to constitute the second impedance while the secondary side of the separating type transformer (IT200) provides AC power of voltage rise or voltage drop to the AC input ends of the rectifier device (BR101) while the DC output ends of the rectifier device (BR101) are used to drive the unidirectional conducting light emitting diode set (L100).

Color of the individual light emitting diodes (LED101) of the uni-directional conducting light emitting diode set (L100)

in the uni-directional light emitting diode drive circuit (U100) of the uni-directional light emitting diode drive circuit in bi-directional divided power impedance can be optionally selected to be constituted by one or more than one colors.

The relationships of location arrangement between the individual light emitting diodes (LED101) of the uni-directional conducting light emitting diode set (L100) in the uni-directional light emitting diode drive circuit (U100) of the uni-directional light emitting diode drive circuit in bi-directional divided power impedance include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric position.

The uni-directional light emitting diode drive circuit in bi-directional divided power impedance, in which the embodiments of its uni-directional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated together to one structure.

As is summarized from above descriptions, progressive performances of power saving, low heat loss and low cost can be provided by the uni-directional light emitting diode drive circuit in bi-directional divided power impedance through the charging/discharging by the uni-polar capacitor to drive the light emitting diode

The invention claimed is:

1. A uni-directional light emitting diode drive circuit in bi-directional divided power impedance, wherein a first impedance includes capacitive impedance components, inductive impedance components, or resistive impedance components and a second impedance includes capacitive impedance components, inductive impedance components, or resistive impedance components; wherein, the first impedance and the second impedance are in series connection to receive the following:
   1) AC power with a constant or variable voltage and a constant or variable frequency; or
   2) AC power of bi-directional sinusoidal wave voltage or bi-directional square wave voltage, or bi-directional pulse wave voltage with constant or variable voltage and constant or variable frequency or period which is converted from a DC power source; or
   3) AC power of bi-directional sinusoidal wave voltage or bi-directional square wave voltage, or bi-directional pulse wave voltage with constant or variable voltage and constant or variable frequency or period converted from the DC power which is further rectified from an AC power;
   a power source voltage input is divided by the first impedance and second impedance in series connection, wherein the divided power is supplied to a rectifier device which provides a DC power output through its DC output ends to drive a uni-directional conducting light emitting diode set which includes light emitting diodes to emit light;
the first impedance, second impedance, rectifier device and uni-directional conducting light emitting diode set as well as the light emitting diode and various optional auxiliary circuit components are based on application needs, wherein the circuit components can be optionally installed or not installed as needed and the installed quantity may include one, wherein if more than one circuit component is selected in the application, the corresponding polarity relationship of the selected components shall be determined based on circuit function requirement to execute series connection, or parallel connection or series and parallel connections, wherein:
   a DC to AC Inverter (4000) including conventional electromechanical components or solid state power components and related electronic circuit components, wherein its input ends are optionally provided as needed to receive input from a constant or variable voltage DC power, or a DC power rectified from an AC power, while its output ends are optionally selected as needed to supply a bi-directional power of bi-directional sinusoidal wave, or bi-directional square wave or bi-directional pulsed wave AC power in a constant or variable voltage and constant or variable alternated polarity frequency or periods;
   the circuit operating functions are the following:
      the uni-directional light emitting diode drive circuit (U100) is parallel connected across the output ends of the conventional DC to AC inverter (4000); the input ends of the DC to AC inverter (4000) are optionally provided as needed to receive input from a constant or variable voltage DC power, or a DC power rectified from an AC power;
      the output ends of the DC to AC inverter (4000) can be optionally selected as needed to provide a bi-directional power of bi-directional sinusoidal wave, or bi-directional square wave, or bi-directional pulse wave power in a constant or variable voltage and constant or variable alternated periods, which is used to control and drive the uni-directional light emitting diode drive circuit (U100);
      in addition, the uni-directional light emitting diode drive circuit (U100) can be controlled and driven by means of modulating the output power from the DC to AC inverter (4000), as well as by executing power modulations to the power outputted such as pulse width modulation, or conductive current phase angle control, or impedance modulation.

2. A uni-directional light emitting diode drive circuit in bi-directional divided power impedance as claimed in claim 1, wherein the first impedance includes at least one capacitive impedance component, inductive impedance component, or resistive component and the second impedance includes at least one capacitive impedance component, inductive impedance component, or resistive impedance component; thereof the first impedance and the second impedance are in series connection, wherein at least one rectifier device is installed, and the input ends of the said rectifier device is provided to receive the divided power across the two ends of the first impedance or the second impedance and the DC power output from the said rectifier device is used to drive at least one uni-directional conducting light emitting diode;
   the two ends of the first impedance and the second impedance in series connection are provided to receive:
   1) the AC power with a constant or variable voltage and a constant or variable frequency; or
   2) the AC power of bi-directional sinusoidal wave voltage or bi-directional square wave voltage, or bi-directional pulse wave voltage with constant or variable voltage and constant or variable frequency or period which is converted from a DC power source; or
   3) the AC power of bi-directional sinusoidal wave voltage or bi-directional square wave voltage, or bi-directional pulse wave voltage with constant or variable voltage and constant or variable frequency or period converted from the DC power which is further rectified from an AC power;

the bi-directional divided power of the first impedance or the second impedance is rectified by the rectifier device to drive at least one uni-directional conducting light emitting diode or is driven by at least two rectifier devices which are respectively parallel connected across the two ends of the first and second impedances for the rectifier devices to respectively receive the AC power of the first and second impedances and rectify as DC power output to drive the individual uni-directional conducting light emitting diodes; wherein:

a first impedance (Z101) is comprised of:
1) capacitive impedance components, or inductive impedance components or resistive impedance components, wherein it can be optionally installed as needed one kind or more than one kind and one or more than one impedance components, or can be optionally installed as needed by two or more than two kinds of impedance components, wherein each kind of impedance components can be respectively to be one or more than one in series connection, or parallel connection or series and parallel connection; or
2) at least one capacitive impedance component and at least one inductive impedance component in mutually series connection, wherein their inherent series resonance frequency is the same as the frequency of bi-directional power from power source such as the AC power, or the alternated polarity period of the constant or variable periodically alternated polarity power converted from a DC power, thereby to appear in a series resonance impedance status; or
3) at least one capacitive impedance component and at least one inductive impedance component in mutual parallel connection, wherein their inherent parallel resonance frequency after parallel connection is the same as frequency of the bi-directional power from power source such as the AC power, or the alternated polarity period of the constant or variable periodically alternated polarity power converted from a DC power, thereby to appear a parallel resonance impedance status;

a second impedance (Z102) is comprised of:
1) capacitive impedance components, or inductive impedance components or resistive impedance components, wherein it can be optionally installed as needed one kind or more than one kind and one or more than one impedance components, or can be optionally installed as needed by two or more than two kinds of impedance components, wherein each kind of impedance components can be respectively to be one or more than one in series connection, or parallel connection or series and parallel connection; or
2) at least one capacitive impedance component and at least one inductive impedance component in mutually series connection, wherein their inherent series resonance frequency is the same as the frequency of bi-directional power from power source such as the AC power, or the alternated polarity period of the constant or variable periodically alternated polarity power converted from a DC power, thereby to appear in a series resonance impedance status; or
3) at least one capacitive impedance component and at least one inductive impedance component in mutual parallel connection, wherein their inherent parallel resonance frequency after parallel connection is the same as frequency of the bi-directional power from power source such as the AC power, or the alternated polarity period of the constant or variable periodically alternated polarity power converted from a DC power, thereby to appear a parallel resonance impedance status;

at least one first impedance (Z101) and at least one second impedance (Z102) are mutually series connected, wherein the two ends of the first impedance (Z101) and the second impedance (Z102) in series connection are provided for:
1) the AC power with a constant or variable voltage and a constant or variable frequency; or
2) the AC power of bi-directional sinusoidal wave voltage or bi-directional square wave voltage, or bi-directional pulse wave voltage with constant or variable voltage and constant or variable frequency or period which is converted from a DC power source; or
3) the AC power of bi-directional sinusoidal wave voltage or bi-directional square wave voltage, or bi-directional pulse wave voltage with constant or variable voltage and constant or variable frequency or period converted from the DC power which is further rectified from an AC power;

the divided power is formed at the two ends of the first impedance (Z101) and the two ends of the second impedance (Z102) trough power input, wherein the divided power is provided to the AC input ends of the rectifier device (BR101);

a rectifier device (BR101) parallel connected across the two ends of the first impedance (Z101) or the second impedance (Z102), or respectively parallel connected across two ends of the first impedance (Z101) and the second impedance (Z102) simultaneously, thereby the divided power across the two ends of the first impedance (Z101) or the second impedance (Z102) is rectified to a DC power which is used to drive the uni-directional conducting light emitting diode set (L100);

the rectifier device can include a bridge type rectifier device or by a half-wave rectifier device, wherein the number of rectifier device (BR101) can be one or more than one;

an uni-directional conducting light emitting diode set (L100) including a forward current polarity light emitting diode, or two or more than two forward current polarity light emitting diodes in series connection or parallel connection, or three or more than three forward current polarity light emitting diodes in series connection, parallel connection or series and parallel connection;

the uni-directional conducting light emitting diode set (L100) can be selected as needed to be installed one set or more than one sets to be driven by DC power output from the rectifier device (BR101);

one or more than one first impedance (Z101), second impedance (Z102), uni-directional conducting light emitting diode set (L100) and rectifier device (BR101) in the uni-directional light emitting diode drive circuit (U100) can be optionally installed as needed;

the divided power produced by the first impedance or the second impedance is rectified by a rectifier device to DC power and is used to drive at least one uni-directional conducting light emitting diode, or the AC powers of the first impedance and the second impedance are respectively rectified by two rectifier devices which are respectively parallel connected across the two ends of the first impedance and the second impedance to DC powers and are used to drive the individual uni-directional conducting light emitting diodes.

3. A uni-directional light emitting diode drive circuit in bi-directional divided power impedance as claimed in claim 1, comprising the following:
a first impedance (Z101) including at least one capacitive impedance component, especially by the capacitor (C100), wherein the number of the first impedance can be one or more than one;
a second impedance (Z102) including at least one capacitive impedance component, especially by the capacitor (C102), wherein the number of the second impedance can be one or more than one;
at least one first impedance (Z101) and at least one second impedance (Z102) are in series connection, wherein the two ends of them after series connection are provided for receiving:
1) AC power with a constant or variable voltage and a constant or variable frequency; or
2) AC power of bi-directional sinusoidal wave voltage or bi-directional square wave voltage, or bi-directional pulse wave voltage with constant or variable voltage and constant or variable frequency or period which is converted from a DC power source; or
3) AC power of bi-directional sinusoidal wave voltage or bi-directional square wave voltage, or bi-directional pulse wave voltage with constant or variable voltage and constant or variable frequency or period converted from the DC power which is further rectified from an AC power;
a rectifier device (BR101): at least one rectifier device (BR101) is installed to receive the divided power from the two ends of the first impedance (Z101) or the second impedance (Z102), or two or more than two rectifier devices (BR101) are respectively installed to receive the divided power from the two ends of the first impedance (Z101) or the second impedance (Z102) thereby the divided power across the two ends of the first impedance (Z101) or the second impedance (Z102) is rectified to DC power to drive the uni-directional conducting light emitting diode set (L100);
the rectifier device can include a bridge type rectifier device or by a half-wave rectifier device, wherein the number of rectifier device (BR101) can be one or more than one;
an uni-directional conducting light emitting diode set (L100) including a forward current polarity light emitting diode (LED101), or two or more than two forward current polarity light emitting diodes (LED101) in series connection or parallel connection, or three or more than three forward current polarity light emitting diodes (LED101) in series connection, parallel connection or series and parallel connection; one or more than one set of the uni-directional conducting light emitting diode set (L100) can be optionally installed as needed to be driven by the DC power output from the rectifier device (BR101);
the AC input ends of the rectifier device (BR101) are provided to receive the divided power across the two ends of the capacitor (C102) which constitute the second impedance (Z102), whereby the uni-directional conducting light emitting diode set (L100) is driven by the DC power rectified by the said rectifier unit (BR101), and the first impedance (Z101) is used to limit its current, wherein in case that the capacitor (C100) is used as the first impedance component, its output current is limited by the capacitive impedance;
a discharge resistor (R101) optionally installed as needed to be parallel connected across the two ends of the capacitor (C100) which constitutes the first impedance (Z101) to release the residual charge of capacitor (C100);
a discharge resistor (R102) optionally installed as needed to be parallel connected across the two ends of the capacitor (C102) which constitutes the second impedance (Z102) to release the residual charge of capacitor (C102);
a current limit resistor (R103) an optionally installed as needed to be individually series connected with each of light emitting diodes (LED101) which constitute the uni-directional conducting light emitting diode set (L100), whereby to limit the current passing through the light emitting diode (LED101); wherein the current limit resistor (R103) can also be replaced by an inductive impedance component (I103);
the uni-directional light emitting diode drive circuit (U100) includes the first impedance (Z101), the second impedance (Z102), the rectifier device (BR101) and the uni-directional conducting light emitting diode set (L100) according to above said circuit structure.

4. A uni-directional light emitting diode drive circuit in bi-directional divided power impedance as claimed in claim 1, wherein the uni-directional conducting light emitting diode set (L100) in the uni-directional light emitting diode drive circuit (U100) is through the divided power distribution effect by the parallel connection between the rectifier device (BR101) and the second impedance (Z102) to reduce the voltage variation rate across the two ends of uni-directional conducting light emitting diode set (L100) corresponding to the power source of voltage variation.

5. A uni-directional light emitting diode drive circuit in bi-directional divided power impedance as claimed in claim 1, wherein the light emitting diode (LED101) which constitutes the uni-directional conducting light emitting diode set (L100) in the uni-directional light emitting diode drive circuit (U100) includes the uni-directional conducting light emitting diode set (L100) including a forward current polarity light emitting diode (LED101), or two or more than two forward current polarity light emitting diodes (LED101) in series connection or parallel connection, or three or more than three forward current polarity light emitting diodes (LED101) in series connection, parallel connection or series and parallel connection, wherein one or more than one set of the uni-directional conducting light emitting diode set (L100) can be optionally installed as needed.

6. A uni-directional light emitting diode drive circuit in bi-directional divided power impedance as claimed in claim 1, wherein to protect the light emitting diode and to avoid the light emitting diode (LED101) being damaged or reduced working life by abnormal voltage, a zener diode can be further parallel connected across the two ends of the light emitting diode (LED101) of the uni-directional conducting light emitting diode set (L100) in the uni-directional light emitting diode drive circuit (U100) of the uni-directional light emitting diode drive circuit in bi-directional divided power impedance, or the zener diode can be first series connected with at least one diode to produce zener voltage function, then parallel connected across the two ends of the light emitting diode (LED101), including the following:

a zener diode (ZD101) is parallel connected across the two ends of the light emitting diode (LED101) of the uni-directional conducting light emitting diode set (L100) in the uni-directional light emitting diode drive circuit (U100), wherein their polarity relationship is that the zener voltage of the zener diode (ZD101) is used to limit the working voltage across the two ends of the light emitting diode (LED101);

the zener diode (ZD101) is parallel connected across the two ends of the light emitting diode (LED101) of the uni-directional conducting light emitting diode set (L100) in the uni-directional light emitting diode drive circuit (U100), wherein the said zener diode (ZD101) can be optionally series connected with a diode (CR201) as needed to produce the zener voltage effect together, whereby the advantages are 1) the zener diode (ZD101) can be protected from abnormal reverse voltage; 2) both diode (CR201) and zener diode (ZD101) have temperature compensation effect.

7. A uni-directional light emitting diode drive circuit in bi-directional divided power impedance as claimed in claim 1, wherein to promote the lighting stability of the light source produced by the light emitting diode in the uni-directional light emitting diode drive circuit (U100), the light emitting diode (LED101) can be further installed with a charge/discharge device (ESD101), wherein random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously; wherein:

the uni-directional conducting light emitting diode set (L100) can be further installed with a charge/discharge device (ESD101) including to be parallel connected across the two ends of the light emitting diode (LED101) and the current limit resistor (R103) in series connection, or across the two ends of the light emitting diode (LED101) according to polarities, wherein random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

the aforesaid charge/discharge device (ESD101) can include the conventional charging and discharging batteries, or super-capacitors or capacitors.

8. A uni-directional light emitting diode drive circuit in bi-directional divided power impedance as claimed in claim 1, wherein in the uni-directional light emitting diode drive circuit (U100), the uni-directional conducting light emitting diode set (L100) can be optionally selected to be installed by one set or can be selected to be installed by more than one sets in series connection, parallel connection or series and parallel connection, wherein if one or more than one sets are installed, it can be jointly driven by the divided power of the same second impedance (Z102) through its matched rectifier device (BR101), or it can be individually driven by the divided power of multiple second impedances (Z102) in series or parallel connection, wherein each of the multiple second impedances (Z102) is installed with a rectifier device (BR101) individually to drive its corresponding matched uni-directional conducting light emitting diode set (L100) individually.

9. A uni-directional light emitting diode drive circuit in bi-directional divided power impedance as claimed in claim 1, wherein if a charge/discharge device (ESD101) is installed in the uni-directional light emitting diode drive circuit (U100), then the light emitting diode (LED101) of the uni-directional conducting light emitting diode set (L100) is driven by DC power to emit light continuously.

10. A uni-directional light emitting diode drive circuit in bi-directional divided power impedance as claimed in claim 1, wherein if the charge/discharge device (ESD101) is not installed, then current conduction to light emitting diode (LED101) is intermittent, whereby referring to the input voltage wave shape and duty cycle of current conduction, the light emitting forward current and the peak of light emitting forward voltage of each light emitting diode in the uni-directional conducting light emitting diode set (L100) can be correspondingly selected for the light emitting diode (LED101); if current conduction to light emitting diode (LED101) is intermittent, the peak of light emitting forward voltage can be correspondingly selected based on the duty cycle of current conduction as long as the principle of that the peak of light emitting forward voltage does not damage the light emitting diode (LED101) is followed.

11. A uni-directional light emitting diode drive circuit in bi-directional divided power impedance as claimed in claim 1, wherein if the charge/discharge device (ESD101) is not installed, then based on the value and wave shape of the light emitting forward voltage, the corresponding current value and wave shape from the forward voltage vs. forward current ratio are produced; however the peak of light emitting forward current shall follow the principle not to damage the light emitting diode (LED101).

12. A uni-directional light emitting diode drive circuit in bi-directional divided power impedance as claimed in claim 1, wherein in the application of the uni-directional light emitting diode drive circuit (U100), the following different types of bi-directional power can be provided for inputs, wherein the bi-directional power includes:

1) AC power with a constant or variable voltage and a constant or variable frequency; or
2) AC power of bi-directional sinusoidal wave voltage or bi-directional square wave voltage, or bi-directional pulse wave voltage with constant or variable voltage and constant or variable frequency or period which is converted from a DC power source; or
3) AC power of bi-directional sinusoidal wave voltage or bi-directional square wave voltage, or bi-directional pulse wave voltage with constant or variable voltage and constant or variable frequency or period converted from the DC power which is further rectified from an AC power.

13. A uni-directional light emitting diode drive circuit in bi-directional divided power impedance as claimed in claim 1, wherein it is series connected to the power modulator of series connection type, wherein the power modulator of series connection type includes the following:

a bi-directional power modulator of series connection type (300) including the conventional electromechanical components or solid state power components and related electronic circuit components to modulate the bi-directional power output;

a DC power modulator of series connection type (360) including the conventional electromechanical components or solid state power components and related electronic circuit components to modulate the DC power for voltage stabilization, or DC pulsed power output;

the circuit operating functions are the following:
1) the bi-directional power modulator of series connection type (300) is series connected with the uni-directional light emitting diode drive circuit (U100) to receive the bi-directional power from power source, whereby the bi-directional power is modulated by the bi-directional power modulator of series connection type (300) to execute power modulations such as pulse width modulation or current conduction phase angle control, or impedance modulation to drive the uni-directional light emitting diode drive circuit (U100); or
2) the bi-directional power modulator of series connection type (300) is series connected between the second impedance (Z102) and the AC input ends of the rectifier device (BR101) whereby the bi-directional divided power from the two ends of the second impedance (Z102) is modulated by the bi-directional power modulator of series connection type (300) to execute power modulations such as pulse width modulation or current conduction phase angle control, or impedance modulation to drive the uni-directional conducting light emitting diode set (L100) through the rectifier device (BR101); or
3) the DC power modulator of series connection type (360) is series connected between the DC output ends of the rectifier device (BR101) and the uni-directional conducting light emitting diode set (L100), whereby DC power from the rectifier device (BR101) is modulated by the DC power modulator of series connection type (360) to execute power modulations such as pulse width modulation or current conduction phase angle control, or impedance modulation to drive the uni-directional conducting light emitting diode set (L100).

14. A uni-directional light emitting diode drive circuit in bi-directional divided power impedance as claimed in claim 1, wherein it is parallel connected to a power modulator of parallel connection type, wherein the power modulator of parallel connection type comprises the following:
a bi-directional power modulator of parallel connection type (400) including conventional electromechanical components or solid state power components and related electronic circuit components to modulate the bi-directional power output;
a DC power modulator of parallel connection type (460) including conventional electromechanical components or solid state power components and related electronic circuit components to modulate the DC power for voltage stabilization, or DC pulsed power output;
the circuit operating functions are the following:
1) the bi-directional power modulator of parallel connection type (400) is installed, wherein its output ends are for parallel connection with the uni-directional light emitting diode drive circuit (U100), while its input ends are provided for receiving the bi-directional power from the power source, whereby the bi-directional power is modulated by the bi-directional power modulator of parallel connection (400) to execute power modulations such as pulse width modulation or current conduction phase angle control, or impedance modulation to drive the uni-directional light emitting diode drive circuit (U100); or
2) the bi-directional power modulator of parallel connection type (400) is installed, wherein its output ends are parallel connected with the bi-directional power input ends of the rectifier device (BR101) while its input ends are parallel connected across the two ends of the second impedance (Z102), whereby the bi-directional divided power across the two ends of the second impedance (Z102) is modulated by the bi-directional power modulator of parallel connection type (400) to execute power modulations such as pulse width modulation or current conduction phase angle control, or impedance modulation to drive the uni-directional conducting light emitting diode set (L100) by the DC power which is rectified by the rectifier device (BR101); or
3) the DC power modulator of parallel connection type (460) is installed, wherein its output ends are parallel connected with the uni-directional conducting light emitting diode set (L100), while its input ends are parallel connected with the DC output ends of the rectifier device (BR101), whereby the DC power of the rectifier device (BR101) is modulated by the DC power modulator of parallel connection type (460) to execute power modulations such as pulse width modulation or current conduction phase angle control, or impedance modulation to drive the uni-directional conducting light emitting diode set (L100).

15. A uni-directional light emitting diode drive circuit in bi-directional divided power impedance as claimed in claim 1, wherein it is series connected with a power modulator of series connection type which is driven by the output power of the DC to AC inverter, wherein the constitutions of the DC to AC inverter and the power modulator of series connection type include the following:
a bi-directional power modulator of series connection type (300) including conventional electromechanical components or solid state power components and related electronic circuit components to modulate the bi-directional power output;
a DC power modulator of series connection type (360) including conventional electromechanical components or solid state power components and related electronic circuit components to modulate the DC power for voltage stabilization, or DC pulsed power output;
the circuit operating functions are described in the following:
1) a bi-directional power modulator of series connection type (300) is series connected with the uni-directional light emitting diode drive circuit (U100); after the two are in series connection, they are parallel connected with the output ends of the DC to AC inverter (4000), and the output ends of the DC to AC inverter can be optionally selected as needed to provide a bi-directional power of a bi-directional sinusoidal wave, square wave or pulse wave power output at a constant or variable voltage and constant or variable alternated polarity frequency or periods, and the bi-directional power output of the DC to AC inverter (4000) is modulated by the bi-directional power modulator of series connection type (300) to execute power modulations such as pulse width modulation or current conduction phase angle control, or impedance modulation to drive the uni-directional light emitting diode drive circuit (U100); or
2) the bi-directional power modulator of series connection type (300) is series connected between the second impedance (Z102) and the AC input ends of the rectifier device (BR101) whereby the bi-directional divided power across the two ends of the second impedance (Z102) is modulated by the bi-directional power modulator of series connection type (300) to execute power modulations such as pulse width modulation or current conduction phase angle control, or impedance modulation to drive the uni-directional conducting light emitting diode set (L100) through the rectifier device (BR101); or 3) the DC power modulator of series connection type (360) is series connected between the DC output ends of the rectifier device (BR101) and the uni-directional conducting light emitting diode set (L100), whereby DC power from the rectifier device (BR101) is modulated by the DC power modulator of series connection type (360) to execute power modulations such as pulse width modulation or current conduction phase angle control, or impedance modulation to drive the uni-directional conducting light emitting diode set (L100).

16. A uni-directional light emitting diode drive circuit in bi-directional divided power impedance as claimed in claim 1, wherein it is parallel connected with a power modulator of parallel connection type which is driven by the output power of the DC to AC inverter, wherein the constitutions of the DC to AC inverter and the power modulator of parallel connection type include the following:

a bi-directional power modulator of parallel connection type (400) including conventional electromechanical components or solid state power components and related electronic circuit components to modulate the bi-directional power output;

DC power modulator of parallel connection type (460) including conventional electromechanical components or solid state power components and related electronic circuit components to modulate the DC power for voltage stabilization, or DC pulsed power output;

the circuit operating functions are described in the following:

(1) a bi-directional power modulator of parallel connection type (400) is installed, wherein its output ends are parallel connected with the input ends of the uni-directional light emitting diode drive circuit (U100) and its input ends are provided to receive the bi-directional power output from the DC to AC inverter (4000), whereby the bi-directional power output of the DC to AC invert (4000) is modulated by the bi-directional power modulator of parallel connection type (400) to execute power modulations such as pulse width modulation or current conduction phase angle control, or impedance modulation to drive the uni-directional light emitting diode drive circuit (U100); or (2) the bi-directional power modulator of parallel connection type (400) is installed, wherein its output ends are parallel connected with the AC input ends of the rectifier device (BR101) while its input ends are parallel connected with the second impedance (Z102), whereby the bi-directional divided power across the two ends of the second impedance (Z102) is modulated by the bi-directional power modulator of parallel connection type (400) to execute power modulations such as pulse width modulation or current conduction phase angle control, or impedance modulation to drive the uni-directional conducting light emitting diode set (L100) through the rectifier device (BR101); or (3) the DC power modulator of parallel connection type (460) is installed, wherein its output ends are parallel connected with the uni-directional conducting light emitting diode set (L100), while its input ends are parallel connected with the DC output ends of the rectifier device (BR101), whereby the DC power of the rectifier device (BR101) is modulated by the DC power modulator of parallel connection type (460) to execute power modulations such as pulse width modulation or current conduction phase angle control, or impedance modulation to drive the uni-directional conducting light emitting diode set (L100).

17. A uni-directional light emitting diode drive circuit in bi-directional divided power impedance as claimed in claim 1, wherein the uni-directional light emitting diode drive circuit (U100) is arranged to be series connected with a least one conventional impedance component (500) and further to be parallel connected with the power source, wherein the impedance (500) includes:

1) a component with capacitive impedance characteristics; or
2) a component with inductive impedance characteristics; or
3) a component with resistive impedance characteristics; or
4) a single impedance component with the combined impedance characteristics of at least two of the resistive impedance, or inductive impedance, or capacitive impedance simultaneously, thereby to provide DC or AC impedances; or
5) a single impedance component with the combined impedance characteristics of capacitive impedance and inductive impedance, wherein its inherent resonance frequency is the same as the frequency or period of bi-directional power, thereby to produce a parallel resonance status; or
6) one kind or more than one kind of one or more than ones capacitive impedance component, or inductive impedance component, or resistive impedance component or two kinds or more than two kinds of impedance components in series connection, or parallel connection, or series and parallel connection so as to provide DC or AC impedances; or
7) the mutual series connection of a capacitive impedance component and an inductive impedance component, wherein its inherent series resonance frequency is the same as the frequency or period of bi-directional power, thereby to produce a series resonance status and the end voltage across two ends of the capacitive impedance component or the inductive impedance component appear in series resonance correspondingly;
or the capacitive impedance and the inductive impedance are in mutual parallel connection, whereby its inherent parallel resonance frequency is the same as the frequency or period of bi-directional power, thereby to produce a parallel resonance status and appear the corresponding end voltage.

18. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102), thereby to constitute the second impedance (Z102), wherein its inherent series resonance frequency with the capacitor (C100) of the first impedance (Z101) in series connection is the same as the frequency of the bi-directional power from power source such as the AC power, or the alternated polarity period of the constant or variable voltage and constant or variable periodically alternated polarity power converted from a DC power to appear in series resonance status, wherein the a, c output ends of the self-coupled voltage change winding (W0) of the self-coupled transformer (ST200) are arranged to provide the AC power of voltage rise to the AC input ends of the rectifier device (BR101), while the output ends of the rectifier device (BR101) are used to drive the uni-directional conducting light emitting diode set (L100).

19. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage drop function, the a, c ends of the self-coupled voltage change winding (W0) of the self-coupled transformer (ST200) are the power supply side which replace the inductive impedance component (I200) of the second impedance (Z102), thereby to constitute the second impedance (Z102), wherein its inherent series resonance frequency with the capacitor (C100) of the first impedance (Z101) in series connection is the same as the frequency of the bi-directional power from power source such as AC power, or the alternated polarity period of the constant or variable voltage and constant or variable periodically alternated polarity power converted from a DC power to appear in series resonance status, wherein the b, c output ends of the self-coupled voltage change winding (W0) of the self-coupled transformer (ST200) are arranged to provide the AC power of voltage drop to the AC input ends of the rectifier device (BR101), while the output ends of the rectifier device (BR101) are used to drive the uni-directional conducting light emitting diode set (L100).

20. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the separating type transformer (IT200) is comprised of a primary side winding (W1) and a secondary side winding (W2), in which the primary side winding (W1) and the secondary side winding (W2) are separated; the primary side winding (W1) constitute the second impedance (Z102), wherein its inherent series resonance frequency with the capacitor (C100) of the first impedance (Z101) in series connection is the same as frequency of the bi-directional power from power source such as the AC power, or the alternated polarity period of the constant or variable voltage and constant or variable periodically alternated polarity power converted to appear in series resonance status, wherein the output voltage of the secondary side winding (W2) of the separating type transformer (IT200) can be optionally selected to provide AC power of voltage rise or voltage drop is arranged to provided to the AC input ends of the rectifier device (BR101), while the DC output ends of the rectifier device (BR101) are used to drive the uni-directional conducting light emitting diode set (L100);

through the above description, the inductive impedance component (I200) of the second impedance (Z102) is replaced by the power supply side winding of the transformer, wherein the secondary side of the separating type transformer (IT200) provides AC power of voltage rise or voltage drop to the AC input ends of the rectifier device (BR101) while the DC output ends of the rectifier device (BR101) are used to drive the uni-directional conducting light emitting diode set (L100).

21. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage raising function, the b, c ends of the self-coupled voltage change winding (W0) of the self-coupled transformer (ST200) is the power supply side which replace the inductive impedance component (I200) of the second impedance (Z102) to be parallel connected with the capacitor (C200), wherein its inherent parallel resonance frequency after parallel connection is the same as frequency of the bi-directional power from power source such as the AC power, or the alternated polarity period of the constant or variable voltage and constant or variable periodically alternated polarity power converted from DC power to produce a parallel resonance status, thereby to constitute the second impedance (Z102), which is series connected with the capacitor (C100) of the first impedance (Z101); further, the capacitor (C200) can be optionally parallel connected with the a, c taps or b, c taps of the self-coupled transformer (ST200), or other selected taps as needed, wherein the a, c output ends of the self-coupled voltage change winding (W0) of the self-coupled transformer (ST200) are arranged to provide AC power of voltage rise to the AC input ends of the rectifier device (BR101), while the DC output ends of the said rectifier device (BR101) are used to provide power to drive the uni-directional conducting light emitting diode set (L100).

22. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage drop function, in which the a, c ends of the self-coupled voltage change winding (W0) of the self-coupled transformer (ST200) are the power supply side which replace the inductive impedance component (I200) of the second impedance (Z102) to be parallel connected with the capacitor (C200), wherein its inherent parallel resonance frequency after parallel connection is the same as frequency of the bi-directional power from power source such as the AC power, the alternated polarity period of the constant or variable voltage and constant or variable periodically alternated polarity power converted from DC power so as to produce a parallel resonance status, thereby to constitute the second impedance (Z102), which is series connected with the capacitor (C100) of the first impedance (Z101), further, the capacitor (C200) can be optionally parallel connected with the a, c taps or b, c taps of the self-coupled transformer (ST200), or other selected taps as needed, wherein the b, c output ends of the self-coupled voltage change winding (W0) of the self-coupled transformer (ST200) are arranged to provide AC power of voltage drop to the AC input ends of the rectifier device (BR101), while the DC output ends of the said rectifier device (BR101) are used to provide power to drive the uni-directional conducting light emitting diode set (L100).

23. A uni-directional light emitting diode drive circuit in bi-directional divided power impedance as claimed in claim 1, wherein the optionally installed inductive impedance component (I200) of the second impedance (Z102) can be further replaced by the power supply side winding of a transformer with inductive effect, wherein the separating type transformer (IT200) is comprised of a primary side winding (W1) and a secondary side winding (W2), in which the primary side winding (W1) and the secondary side winding (W2) are separated; the primary side winding (W1) is parallel connected with the capacitor (C200), wherein its inherent parallel resonance frequency after parallel connection is the same as frequency of the bi-directional power from power source such as the AC power, or the alternated polarity period of the constant or variable voltage and constant or variable periodically alternated polarity power converted from DC power so as to produce a parallel resonance status, thereby to constitute the second impedance (Z102), which is series connected with the capacitor (C100) of the first impedance (Z101); further, the capacitor (C200) can be optionally parallel connected with the a, c taps or b, c taps of the self-coupled transformer (ST200), or other selected taps as needed, the output voltage of the secondary side winding (W2) of the separating type transformer (IT200) can be optionally selected as needed to be voltage rise or voltage drop, and the AC power output from the secondary side winding is arranged to provided to the AC input ends of the rectifier device (BR101), while the DC output ends of the said rectifier device (BR101) is used to provide power to drive the uni-directional conducting light emitting diode set (L100);

(1) through the above description, the inductive impedance component (I200) of the second impedance (Z102) is replaced by the power supply side winding of the transformer and is parallel connected with the capacitor (C200) to appear parallel resonance, thereby to constitute the second impedance while the secondary side of the separating type transformer (IT200) provides AC power of voltage rise or voltage drop to the AC input ends of the rectifier device (BR101) while the DC output ends of the rectifier device (BR101) are used to drive the uni-directional conducting light emitting diode set (L100).

* * * * *